(12) United States Patent
Kawachi et al.

(10) Patent No.: US 10,538,275 B2
(45) Date of Patent: Jan. 21, 2020

(54) T-SHAPED JOINT STRUCTURE

(71) Applicant: NIPPON STEEL CORPORATION, Tokyo (JP)

(72) Inventors: Takeshi Kawachi, Tokyo (JP); Yoshiaki Nakazawa, Tokyo (JP); Masahito Tasaka, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 15/525,389

(22) PCT Filed: Nov. 10, 2015

(86) PCT No.: PCT/JP2015/081619
§ 371 (c)(1),
(2) Date: May 9, 2017

(87) PCT Pub. No.: WO2016/076315
PCT Pub. Date: May 19, 2016

(65) Prior Publication Data
US 2017/0349219 A1    Dec. 7, 2017

(30) Foreign Application Priority Data

Nov. 10, 2014 (JP) ................................. 2014-228275
Feb. 23, 2015 (JP) ................................. 2015-033167

(51) Int. Cl.
*B62D 25/20* (2006.01)
*B62D 21/03* (2006.01)
(Continued)

(52) U.S. Cl.
CPC ......... *B62D 25/2036* (2013.01); *B62D 21/03* (2013.01); *B62D 25/02* (2013.01);
(Continued)

(58) Field of Classification Search
CPC .. B62D 25/20; B62D 25/2036; B62D 25/025; B62D 21/03; B62D 27/02
See application file for complete search history.

(56) References Cited

U.S. PATENT DOCUMENTS 6,129,412 A    10/2000  Tanuma
7,104,596 B2 *  9/2006  Goto .................. B62D 25/2018
                                              296/187.08
(Continued)

FOREIGN PATENT DOCUMENTS

JP    60-124381 U    8/1985
JP    63-149380 U    9/1988
(Continued)

*Primary Examiner* — Jonathan P Masinick
(74) *Attorney, Agent, or Firm* — Birch, Stewart, Kolasch & Birch, LLP

(57) ABSTRACT

The present invention has as its object the provision of a T-shaped joint structure sufficiently securing a mounting region for another member and securing rigidity of a joint part. A first member and a second member joined with the first member and extending in a direction vertical to the longitudinal direction of the first member are provided. In a side view of first member in the longitudinal direction, the part of the first member joined with the second member, that is, a first member side joining element, is slanted from the first member toward the second member so that the first member becomes tapered. The part of the second member joined with the first member, that is, a second member side joining element, is slanted from the first member toward the second member in the same direction as the first member side joining element. The first member side joining element and second member side joining element are smoothly joined to form a joined part. The joined part is present at least at single side of the first and second member in the lateral direction.

3 Claims, 9 Drawing Sheets

(51) Int. Cl.
   *B62D 27/02* (2006.01)
   *B62D 25/02* (2006.01)
(52) U.S. Cl.
   CPC ............. *B62D 25/20* (2013.01); *B62D 27/02* (2013.01); *B62D 27/023* (2013.01); *B62D 25/025* (2013.01)

(56) References Cited

U.S. PATENT DOCUMENTS

| | | | | |
|---|---|---|---|---|
| 7,823,964 B2* | 11/2010 | Tasumi | ................ | B62D 21/157 296/204 |
| 8,070,215 B2* | 12/2011 | Yoshioka | ............. | B62D 25/025 296/187.12 |
| 8,235,458 B2* | 8/2012 | Mori | .................... | B62D 21/157 296/193.06 |
| 8,292,356 B2* | 10/2012 | Ishigame | ............. | B62D 21/157 296/193.05 |
| 8,308,227 B2* | 11/2012 | Tsuruta | ................ | B62D 21/157 296/209 |
| 8,567,857 B2* | 10/2013 | Fujii | ..................... | B60R 22/023 296/193.05 |
| 8,708,402 B2* | 4/2014 | Saeki | ....................... | B60K 1/04 180/68.5 |
| 8,967,704 B2* | 3/2015 | Kurokawa | ............ | B62D 25/025 296/193.06 |
| 9,108,682 B2* | 8/2015 | Mori | ..................... | B62D 21/157 |
| 9,487,243 B2* | 11/2016 | Qu | ..................... | B62D 25/2036 |
| 9,783,239 B2* | 10/2017 | Iyoshi | ..................... | B62D 25/04 |
| 2009/0134667 A1 | 5/2009 | Tasumi et al. | | |
| 2010/0156146 A1 | 6/2010 | Matsuyama | | |
| 2010/0207426 A1 | 8/2010 | Tsuruta et al. | | |
| 2011/0175399 A1* | 7/2011 | Nakano | ................ | B62D 21/157 296/193.05 |
| 2011/0210582 A1* | 9/2011 | Mori | .................... | B62D 21/157 296/193.07 |
| 2013/0049405 A1* | 2/2013 | Kurogi | ................... | B62D 25/04 296/203.01 |
| 2015/0003898 A1* | 1/2015 | Shiozaki | ............... | B62D 27/023 403/267 |
| 2016/0194034 A1* | 7/2016 | Emura | ................ | B62D 25/025 296/209 |
| 2017/0106906 A1* | 4/2017 | Onishi | ............... | B62D 25/2036 |
| 2017/0151988 A1* | 6/2017 | Richeton | ................ | B62D 65/06 |

FOREIGN PATENT DOCUMENTS

| | | |
|---|---|---|
| JP | 4-287777 A | 10/1992 |
| JP | 5-17349 Y | 5/1993 |
| JP | 2007-125974 A | 5/2007 |

\* cited by examiner

T-SHAPED JOINT STRUCTURE

TECHNICAL FIELD

The present invention relates to a T-shaped joint structure designed to both secure the mounting position for another member and secure the rigidity of the joint part.

BACKGROUND ART

In the past, T-shaped joint structures have been used for various structures such as vehicles, ships, buildings, bridges, and general industrial machinery. For example, a structure has been known including two side sills extending in the vehicle-longitudinal-direction at predetermined intervals in the vehicle-lateral-direction and a plurality of cross members connected to both of these side sills and extending in the vehicle-lateral-direction (see Japanese Utility Model Publication No. 60-124381).

SUMMARY OF INVENTION

Technical Problem

FIGS. 1A and 1B and 2A and 2B are views showing the conventional joint structures of side sills and cross-members at the bodies of vehicles. FIGS. 1A and 2A are perspective views, while FIGS. 1B and 2B are views of the lateral surfaces in the vehicle-longitudinal-directions. In the joint structure 10 shown in FIGS. 1A and 1B, the cross member 14 is not connected to the entire region for the lateral surface 12a of the side sill 12 in the vehicle-height-direction, so there was the problem that the joint part was insufficient in rigidity against bending deformation or torsional deformation. Note that, in FIGS. 1A and 1B, reference numeral 14f shows a flange formed at the cross member 14, while reference numeral 16 shows a floor panel to which the cross member 14 is connected.

Therefore, in recent years, as shown by the joint structure 20 shown in FIGS. 2A and 2B, a cross member 24 has been joined to a lateral surface 22a and side sill top surface 22b of a side sill 22 to raise the rigidity of the joint part. Note that, in FIGS. 2A and 2B, reference numeral 24f shows a top surface flange formed at the cross member 24, while reference numeral 26 shows a floor panel to which the cross member 24 is joined.

However, at the cross member 24 forming the joint structure 20, as shown in FIG. 2B, there is a part (below, sometimes referred to as the "vehicle width outside part") 24o forming an outside part in the vehicle-lateral-direction and having a profile line at a top side in the vehicle-height-direction (below, sometimes referred to as the "top side line") which is slanted with respect to the vehicle-lateral-direction, that is, a top side line L1o. Usually, as shown in FIG. 2B, it is difficult to attach a seat rail base on the vehicle width outside part 24o with the slanted top side line. For this reason, if the difference in dimension of the vehicle-height-direction between the cross member 24 and the side sill 22 is large, the slanted top side line L1o extends further to the inside of the vehicle-lateral-direction and the mounting region for a seat rail base is liable to be unable to be sufficiently secured. Therefore, in the joint structure including the cross member 24, there is room for improvement from the viewpoint of sufficiently securing the mounting region for a seat rail base and in turn effectively utilizing the cabin space.

The present invention was made in consideration of the above situation and has as its object the provision of a T-shaped joint structure sufficiently securing the mounting region for another member (for example, seat rail base in vehicle-lateral-direction) and securing the rigidity of the joint part.

Solution to Problem

The inventors focused on further broadening the mounting region for a seat rail base in the vehicle-lateral-direction in the joint structure 20 shown in FIGS. 2A and 2B by making the dimension $W1i$ of the component part in the vehicle-lateral-direction (below, sometimes referred to as the "vehicle width inside part") 24i of the cross member 24 connected to the inside of the vehicle width outside part 24o in the vehicle-lateral-direction and with a top side line extending in the vehicle-lateral-direction larger than the overall dimension $W1$ of the cross member 24 in the vehicle-lateral-direction.

However, if making just the dimension $W1i$ of the vehicle width inside part 24i in the vehicle-lateral-direction larger without changing the shape of the side sill 22, the overall dimension $W1$ of the cross member 24 in the vehicle-lateral-direction, and the dimension "h" of the vehicle width inside part 24i in the vehicle-height-direction, the dimension $W1o$ of the vehicle width outside part 24o in the vehicle-lateral-direction becomes smaller, so the slant of the top side line $L1o$ of the vehicle width outside part 24o with respect to the vehicle-lateral-direction becomes larger. In this case, in a side view of the vehicle-longitudinal-direction, at the top surface of the vehicle width outside part 24o of the cross member 24 and the top surface of the flange 24f to be joined with the side sill 22, the difference of the slant angle with respect to the vehicle-lateral-direction becomes larger. For this reason, in the same view, the bending angle of these top surfaces becomes larger, so for example when a load arises bending the cross member 24 in the vehicle-height-direction, the bending deformation at the bending point is liable to become greater. In other words, the bending rigidity of the joint part in the vehicle-height-direction is liable to be unable to be sufficiently secured.

Therefore, the inventors focused on, as shown in FIGS. 3A and 3AB (views showing one example of T-shaped joint structure according to present invention, wherein FIG. 3A is a perspective view and FIG. 3B is a view of the lateral surface in the vehicle-longitudinal-direction), increasing the dimension $Wi$ of the vehicle width inside part 34i in the vehicle-lateral-direction for the cross member 34 without excessively increasing the slant of the top side line $Lo$ of the vehicle width outside part 34o with respect to the vehicle-lateral-direction. As a result, the inventors obtained the finding that if making the top side line $Ls$ of the side sill 32 slant toward the outside in the vehicle-lateral-direction to the top side in the vehicle-height-direction and connecting the top side line $Lf$ of the top surface flange 34f of the cross member 3 and the top side line $Ls$ of the side sill 32, it is possible to reduce the bending angle of the top surface of the vehicle width outside part 34o and the top surface of the flange 34f and it is possible to avoid the above problem of insufficient rigidity of the joint part and in turn simultaneously secure a broad mounting region for a seat rail base and secure rigidity of the joint part.

Based on the above findings, the inventors completed the present invention. The gist is as follows.

[1] A T-shaped joint structure provided with a first member and a second member joined to the first member and extending in a direction vertical to a longitudinal direction of the first member,
wherein in a side view of the first member in the longitudinal direction,
a first member side joining element as a part of the first member, joined to the second member is slanted from the first member toward the second member so that the first member tapers,
a second member side joining element as a part of the second member, joined to the first member is slanted from the first member toward the second member in the same direction as the first member side joining element,
the first member side joining element and the second member side joining element are smoothly joined to form a joined part, and the joined part is present at least at single side in the lateral direction of the first and second members.

[2] The T-shaped joint structure according to [1], wherein, in a side view of the first member in the longitudinal direction, an angle formed by a longitudinal direction of the second member and a front surface of the first member side joining element is 25° or less.

[3] The T-shaped joint structure according to [1] or [2], wherein, in a side view of the first member in the longitudinal direction, a ratio H2/H1 of a minimum dimension H2 with respect to a maximum dimension H1 in a direction vertical to the longitudinal direction of the second member at a part of the second member other than the second member side joining element is 0.5 to 0.92.

The T-shaped joint structure according to [2] or [3], wherein when the angle formed by the longitudinal direction of the second member and the front surface of the first member side joining element is made ψ, (H1/H2−1)/2≤tan ψ is satisfied.

Advantageous Effects of Invention

In the T-shaped joint structure according to the present invention, for example, when the T-shaped joint structure is a structure comprised of a side sill (first member) and cross member (second member), the mode of joining the top side line of the top surface flange of the cross member and top side line of the side sill (shapes of first joined part and second joined part and in turn mode of joining the same) is improved predicated on increasing the dimension of the vehicle width inside part of the cross member in the vehicle-lateral-direction. As a result, according to the T-shaped joint structure according to the present invention, it is possible to sufficiently secure a mounting region for another member (for example, seat rail base in vehicle-lateral-direction) and secure rigidity of the joint part.

BRIEF DESCRIPTION OF DRAWINGS

FIGS. 1A and 1B are views showing a conventional joint structure of a side sill and cross member in a body of a vehicle, wherein FIG. 1A is a perspective view and FIG. 1B is a view of the lateral surface in the vehicle-longitudinal-direction.
FIGS. 2A and 2B are views showing a conventional joint structure of a side sill and cross member in a body of a vehicle, wherein FIG. 2A is a perspective view and FIG. 2B is a view of the lateral surface in the vehicle-longitudinal-direction.

FIGS. 3A and 3B are views showing a T-shaped joint structure according to (an embodiment of) the present invention, wherein
FIG. 3A is a perspective view and FIG. 3B is a view of the lateral surface in the vehicle-longitudinal-direction.
FIGS. 4A to 4C are views of the lateral surface in the vehicle-longitudinal-direction showing three modifications of the vehicle-joint-structure shown in FIG. 3B, wherein
FIG. 4A is an example where the two top side lines Lo, Ls extend in a single straight line
and FIGS. 4B and 4C are respectively examples of bending and curving so that the two top side lines Lo, Ls form shapes projecting downward in the vehicle-height-direction.
FIGS. 7A and 7B are views showing a vehicle-joint-structure according to (an embodiment) of the present invention, wherein
FIG. 7A is a perspective view, while
FIG. 7B is a view of the lateral surface in the vehicle-longitudinal-direction.
FIGS. 8A to 8D are perspective views showing modifications of a vehicle-joint-structure shown in FIGS. 7A and 7B, wherein
FIG. 8A is an example where a center pillar is provided with a second flange,
FIG. 8B is an example where a second flange is connected with a first flange,
FIG. 8C is an example where a center pillar is provided with at least one tab,
and FIG. 8D is an example where two tabs are joined.
FIGS. 9A and 9B are views showing a conventional joint structure of a side sill and center pillar in a vehicle body frame, wherein
FIG. 9A is a perspective view, while 9B is a view of the lateral surface in the vehicle-longitudinal-direction.

DESCRIPTION OF EMBODIMENTS

Below, embodiments of the T-shaped joint structure according to the present invention will be explained divided into an Embodiment 1 (combined structure of side sill and cross member) and an Embodiment 2 (combined structure of side sill and cross member). Further, in the Present Description, the "lateral surface in the vehicle-longitudinal-direction" means the lateral surface vertical to the vehicle-longitudinal-direction. Further, in the Present Description, the "vehicle-longitudinal-direction" means the longitudinal direction of the vehicle, the "vehicle-height-direction" means the vertical direction, and the "vehicle-lateral-direction" means the direction vertical to both the vehicle-longitudinal-direction and vehicle-height-direction.

Embodiment 1 (Combined Structure of Side Sill and Cross Member

Figure 3A:
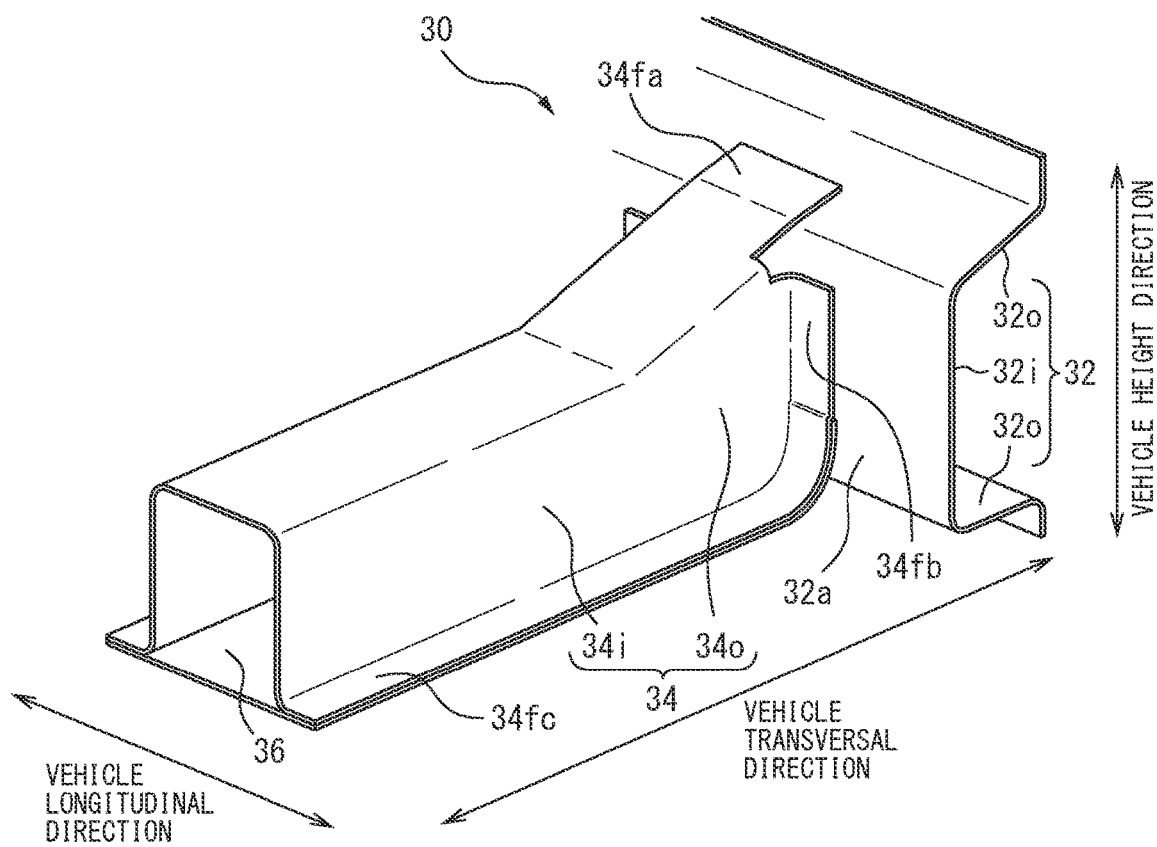
Figure 3B:
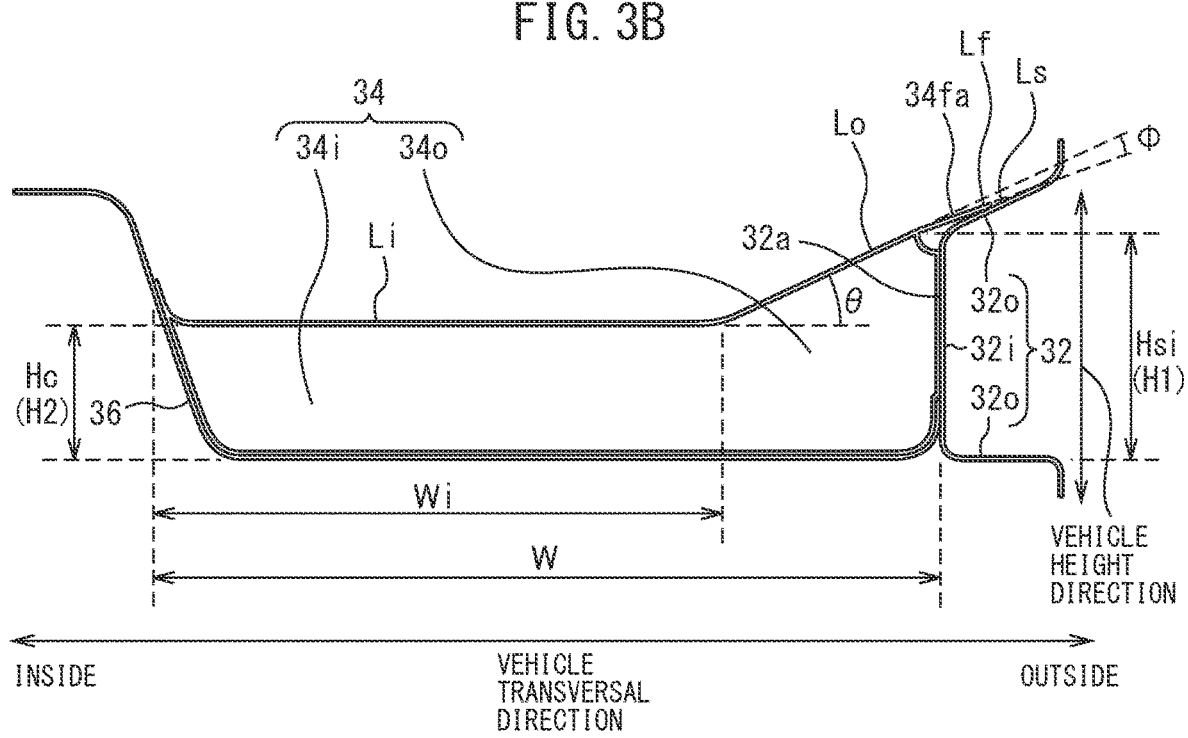

FIGS. 3A and 3B are views showing a vehicle-joint-structure 30 of one type of T-shaped joint structure according to an embodiment of the present invention, where FIG. 3A is a perspective view and FIG. 3B is a view of the lateral surface in the longitudinal direction of the vehicle. The vehicle-joint-structure 30 is a structure relating to a vehicle body. The vehicle-joint-structure 30 is provided with a side sill 32 (first member) extending in the vehicle-longitudinal-direction and a cross member 34 (second member) joined with the side sill 32 and extending in the vehicle-lateral-direction. Note that, in FIG. 3, reference numeral 34fa shows a top surface flange formed at the cross member 34, while reference numeral 36 shows a floor panel to which the cross member 34 is joined. Further, in the Present Description, the "side sill" is a so-called inner member of a side sill.

The side sill 32, as shown in FIG. 3A, is provided with an inside part 32i having a lateral surface 32a vertical to the vehicle-lateral-direction and joined with the cross member 34 and with two outside parts 32o, 32o bent from the inside part 32i and extending to the outside in the vehicle-lateral-direction. Further, the outermost parts of the two outside parts 32o, 32o in the vehicle-lateral-direction are provided with flanges to be joined with a not shown side sill outer panel, center pillar, side panel, or other part.

Further, the side sill 32, as shown in FIG. 3B, has a top side line Ls, that is, profile line of the outside part 32o of the top side in the vehicle-height-direction, slanted toward the outside in the vehicle-lateral-direction to the top side in the vehicle-height-direction. That is, as shown in FIG. 3B, at the side sill 32, the joined part with the cross member 34, that is, the outside part 32o (first member side joining element), is slanted from the side sill 32 toward the cross member 34 so that the side sill 32 becomes tapered.

On the other hand, the cross member 34, as shown in FIG. 3B, is provided with a vehicle width inside part 34i with a top side line Li extending in the vehicle-lateral-direction, a vehicle width outside part 34o connected to the outside of the vehicle width inside part 34i in the vehicle-lateral-direction and slanted with a top side line Lo running toward the outside in the vehicle-lateral-direction to the top side in the vehicle-height-direction and joined with the lateral surface 32a of the side sill 32, and a top surface flange 34a (plate member) connected to the outside of the vehicle width outside part 34o in the vehicle-lateral-direction and joined with the outside part 32o of the side sill 32. That is, as shown in FIG. 3B, at the cross member 34, the joined part with the side sill 32, that is, the vehicle width outside part 34o (second member side joining element), is slanted from the side sill 32 toward the cross member 34 in the same direction as the outside part 32o of the side sill 32 (first member side joining element).

Further, as shown in FIG. 3B, the outside part 32o (first member side joining element) and the vehicle width outside part 34o (second member side joining element) are smoothly joined to form the joined part. This joined part is present at least at one side in the lateral direction of the side sill 32 and cross member 34, that is, only at the top side.

Further, the cross member 34, as shown in FIGS. 3A and 3B (at inside from side sill 32 in vehicle-lateral-direction), can be made one with a dimension Wi of the vehicle width inside part 34i in the vehicle-lateral-direction of 75% to 95% with respect to the overall dimension W in the vehicle-lateral-direction.

Further, at the side sill 32 and the cross member 34, the top side line Ls of the side sill 32 and the top side line Lf of the top surface flange 34fa are connected. Here, the top side lines Ls and Lf being connected means these lines Ls and Lf overlap after considering the amount of deviation due to the plate thicknesses of the side sill 32 and cross member 34.

Note that, the side sill 32 and cross member 34 may be made from any known materials. For example, high strength steel plates, PAN-based carbon fibers using acrylic fibers and carbon-fiber reinforced plastic, and other carbon fiber composite materials, etc. may be used.

Further, the side sill 32 and cross member 34 can both be obtained for example by press-forming high strength steel plates. Further, the cross member 34 can be connected to the side sill 32 by any conventional technique (for example, spot welding, laser welding, and bolting). Alternatively, the side sill and cross member can be formed integrally using casting or injection molding of plastic. In this case, sometimes the joined part between the side sill and cross member (that is, flanges) cannot be defined, but as the vehicle-joint-structure, spot welding etc. may be used to obtain an equivalent shape as the case of connecting the side sill and cross member.

Figure 2A:
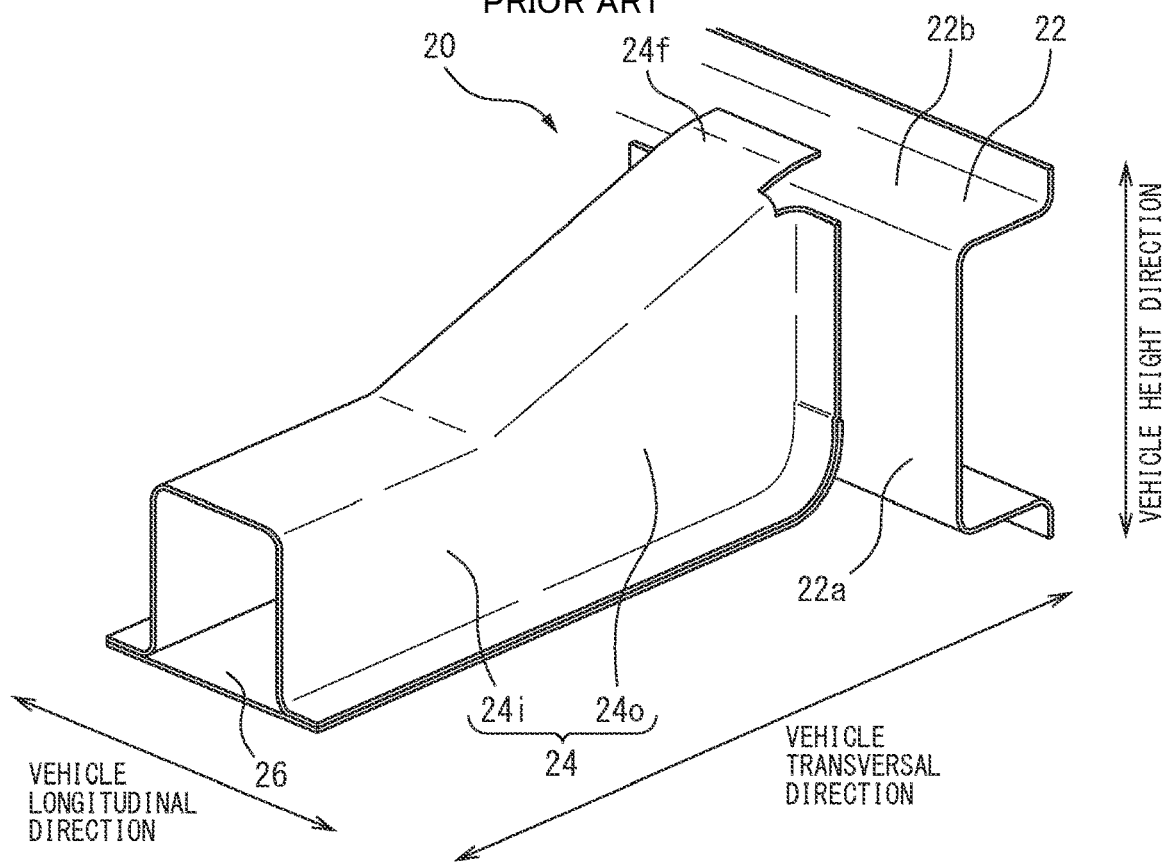
Figure 2B:
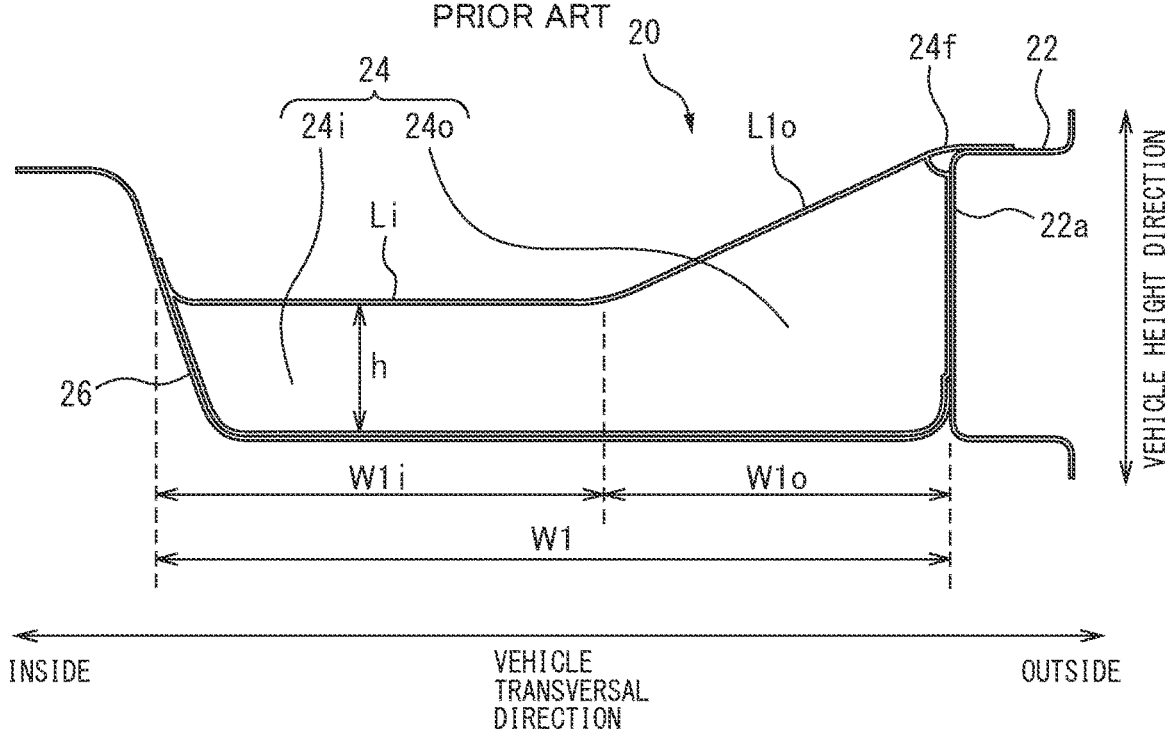

According to the vehicle-joint-structure 30 of the present embodiment configured in this way, the top side line Ls of the side sill 32 can be made slanted toward the outside in the vehicle-lateral-direction to the top side in the vehicle-lateral-direction so as to reduce the difference between the dimension His of the innermost part of the side sill 32 in the vehicle-height-direction along the vehicle-lateral-direction and the dimension Hc of the cross member 34 in the vehicle-height-direction along the vehicle width inside part 34i compared with the difference in dimensions shown by the prior art of FIGS. 2A and 2B. For this reason, it is possible to design the slant angle $\theta$ of the top side line Lo of the vehicle width outside part 34o of the cross member 34 equal to the same slant angle shown in the prior art of FIGS. 2A and 2B while making the dimension Wi of the vehicle width inside part 34i of the cross member 34 in the vehicle-lateral-direction larger than the same dimension W1i of the prior art shown in FIGS. 2A and 2B. Therefore, according to the vehicle-joint-structure 30 of the present embodiment, by forming the top surface flange 34fa for joining with the outside part 32o of the side sill 32 at the cross member 34, it becomes possible to sufficiently secure the mounting region for a seal rail base in the vehicle-lateral-direction and to secure the rigidity of the joint part.

Note that, in the prior art shown in FIGS. 2A and 2B, if trying to sufficiently secure the dimension of the vehicle width inside part 24i of the cross member 24 in the vehicle-lateral-direction, it is necessary to enlarge the slant angle of the top side line Lo of the vehicle width outside part 24o of the cross member 24. For this reason, for example, when a load is applied bending the cross member 24 in the vehicle-height-direction, bending deformation ends up greatly occurring at the bending point of the top side line Li of the vehicle width inside part 24i and the top side line L1o of the vehicle width outside part 24o of the cross member 24. Therefore, in the example shown in FIGS. 2A and 2B, it is not possible to sufficiently secure the rigidity of the joint part. In other words, it is not possible to secure excellent bending rigidity relative to the vehicle-height-direction.

Further, even in the type shown in FIGS. 3A and 3B, if the slant angle $\theta$ of the top side line Lo is excessively large, when using a material with low ductility, for example, a high strength material, to press-form the cross member 34, the side walls of the cross member 34 are liable to crack. For this reason, from the viewpoint of the shapeability, it is not possible to excessively increase the slant angle $\theta$ and there are limits to securing a large length of the vehicle width inside part 34i of the cross member 34 in the vehicle-lateral-direction.

In the vehicle-joint-structure combining a side sill and cross member shown above, at the time of vehicle operation, various loads are applied to the cross member based on the side sill (force in vehicle-longitudinal-direction, force in vehicle-lateral-direction, force in vehicle-height-direction, axial torsion, etc.) It is learned that the rigidities with respect to these loads are all proportional to the joint strength of the joined part and all trend exactly the same. Therefore, as explained above, in the vehicle-joint-structure according to the present embodiment able to sufficiently raise the bending rigidity in the vehicle-height-direction, it can be said that the bending rigidity in the vehicle-longitudinal-direction, the axial rigidity in the vehicle-lateral-direction, and the axial torsional rigidity are sufficiently secured.

Due to this, in the present embodiment, it is possible to sufficiently secure the mounting region for a seat rail base in the vehicle-lateral-direction and possible to secure the rigidity of the joint part.

In such a vehicle-joint-structure 30 (FIGS. 3A and 3B), in a side view of the side sill 32 in the longitudinal direction (first member), preferably the angle formed by the longitudinal direction (horizontal direction) of the cross member 34 (second member) and the front surface of the outside part 32o (first member side joining element) is 45° or less. Note that, the angle formed here is the angle shown in FIG. 3B by (θ-φ). According to such a constitution, it is possible to suppress the slant angle of the side sill 32 with respect to the horizontal plane and further raise the rigidity of the joint part. Note that, if making such an angle α value of 2.5° to 27°, that effect is exhibited at a still higher level.

Further, in the vehicle-joint-structure 30 of FIGS. 3A and 3B, in the side view of the side sill 32 in the longitudinal direction (first member), at the part of the cross member 34 other than the vehicle width outside part 34o (second member side joining element), the ratio H2/H1 of the minimum dimension H2 with respect to the maximum dimension H1 of the cross member 34 in the direction vertical to the longitudinal direction is preferably 0.5 to 0.92. By making the ratio H2/H1 a value of 0.5 or more, it is possible to make the rigidity of the joint part further higher, while by making the ratio a value of 0.92 or less, it is possible to secure a broader cabin space. Note that, when making this ratio H2/H1 a value of 0.65 to 0.79, these effects are exhibited at a further higher level.

Further, in the vehicle-joint-structure 30 of FIGS. 3A and 3B, when making the angle formed ψ, preferably (H1/H2−1)/2≤tan ψ is satisfied. By satisfying this, it is possible to secure the mounting region for a seat rail base, secure the shapeability of the cross member, raise the rigidity of the joint part comprised of the side sill and the cross member, and further increase the bending rigidity of the vehicle body in the vehicle-longitudinal-direction, the bending rigidity in the vehicle-lateral-direction, and axial torsion rigidity in the vehicle-longitudinal-direction.

Note that, by making the dimension of the vehicle width inside part 34i in the vehicle-lateral-direction with respect to the overall width W of the cross member 34 shown in FIGS. 3A and 3B (however, only part at inside from side sill 32 in vehicle-lateral-direction) in the vehicle-lateral-direction (width ratio of vehicle width inside part) a value of 75% or more, it is possible to sufficiently secure the mounting region for a seat rail base in the vehicle-lateral-direction and in turn promote effective utilization of the cabin space. Further, by making the vehicle width inside part width ratio a value of 95% or less, it is possible to secure excellent shapeability, improve the efficiency of transmission of load between the side sill 32 and cross member 34, and realize excellent rigidity of the joint point without making the slant angle θ of the top side line Lo of the vehicle width output part 34o with respect to the vehicle-lateral-direction excessive.

Further, if making the vehicle width inside part width ratio a value of 77% to 90%, it is possible to exhibit the above effects at a still higher level, so this is preferable. If making it 80% to 85%, it is possible to exhibit the above effects at an even higher level, so this is more preferable.

Above, an embodiment of the present invention was explained, but the present invention is not limited to that embodiment and can be changed in various ways within an extent not deviating from the gist of the invention.

Next, other preferred examples of the vehicle-joint-structure 30 shown in the above FIGS. 3A and 3B will be explained. For example, in the example shown in FIGS. 3A and 3B, furthermore, if limiting small the bending angle φ of the line segment comprised of the top side line Lo of the vehicle width outside part 34o and the top side line Lf of the top surface flange 34fa, when a bending load in the vehicle-height-direction is applied to the cross member 34, it is possible to suppress deformation at the bent part of the line segment comprised of the vehicle width outside part 34o and top surface flange 34fa. As a result, it is possible to further improve the rigidity of the joint part, in particular the bending rigidity in the vehicle-height-direction. Specifically, it is preferable to make the absolute value of the bending angle φ a value of 0° to 25°. In this case, it is possible to further suppress deformation of the bent part and possible to further improve the rigidity of the joint part.

Note that, in FIG. 3B, the bending angle φ is defined as an angle at the acute angle side. Further, in the same figure, the bending angle φ is defined as positive when the shape of the line segment formed by the top side line Lo of the vehicle width outside part 34o and top side line Lf of the top surface flange 34fa of the cross member 34 projects upward in the vehicle-height-direction and is defined as negative when it projects downward in the vehicle-height-direction. Therefore, the example shown in FIG. 3B shows the case where the bending angle φ is positive.

Figure 4A:
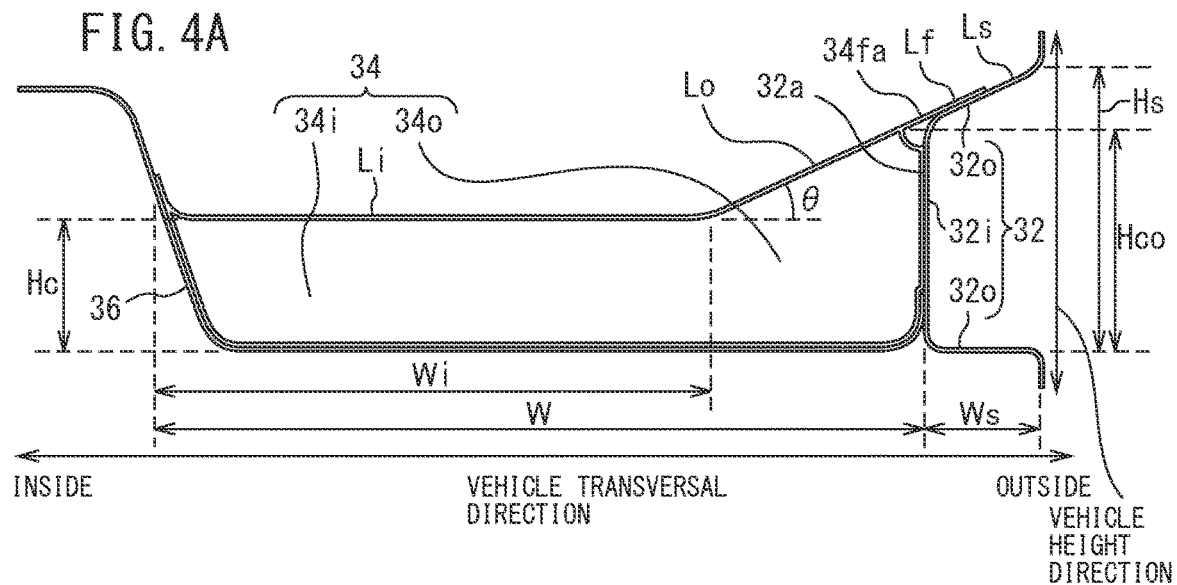
Figure 4B:
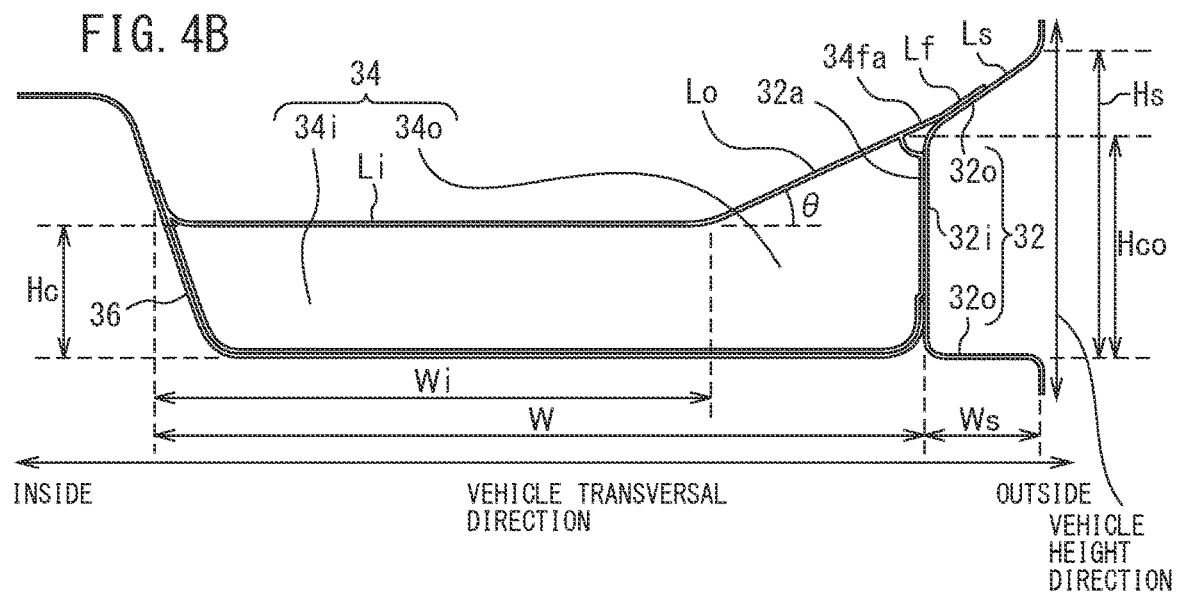
Figure 4C:
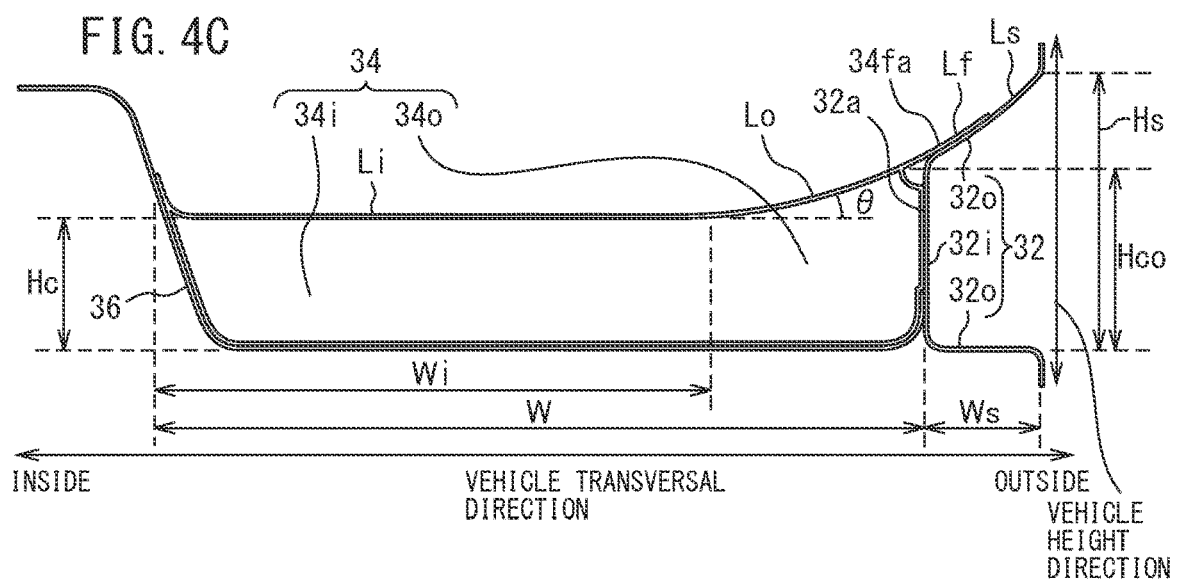

FIGS. 4A to 4C are view of a lateral surface in the vehicle-longitudinal-direction showing three modifications of the vehicle-joint-structure shown in FIG. 3B.

Specifically, the example shown in FIG. 4A is an example where the two top side lines Lo, Ls extend on a single straight line and corresponds to the case where in the example shown in FIG. 3B, the bending angle φ=0° (top side lines Lo, Lf extending in single straight line). That is, the example shown in FIG. 4A is an example where the top side line Ls of the side sill 32, the top side line Lf of the top surface flange 34fa, and the top side line Lo of the vehicle width outside part 34o extend on a single straight line while allowing deviation corresponding to the plate thicknesses of the component elements and is the most preferable embodiment from the viewpoint of improvement of the rigidity of the joint part.

Next, the example shown in FIG. 4B is an example where the two top side lines Lo, Ls are bent forming a shape projecting downward in the vehicle-height-direction and corresponds to the case where the bending angle φ shown in FIGS. 3A and 3B is negative. The example shown in FIG. 4B is preferable in the point of securing the rigidity of the joint part while being able to more broadly secure the upper space of the vehicle width outside part 34o of the cross member 34.

Finally, the example shown in FIG. 4C is an example where, in the same way as the example shown in FIG. 4B, the two top side lines Lo, Ls are curved while shaped projecting downward in the vehicle-height-direction, but there is no clear bent point between the top side line Lo and the top side line Lf and the slant angle with respect to the vehicle-lateral-direction smoothly changes from the vehicle width outside part 34o to the top surface flange 34fa of the cross member 34. In the example shown in FIG. 4C, it is possible to obtain effects similar to the example shown in FIG. 4B for both securing the mounting region in the vehicle-lateral-direction and securing the rigidity of the joint parts.

Note that, in the example shown in FIG. 4C, the top side lines Lo, Ls are shaped projecting downward in the vehicle-height-direction, but these top side lines Lo, Ls may also be shaped projecting upward in the vehicle-height-direction. Further, in the latter case as well, it is possible to eliminate the bent part between the top side lines Lo, Lf and make these Lo, Lf extend smoothly and obtain effects equivalent to the example shown in FIG. 3B (relating to both securing mounting region for seat rail base and securing rigidity of joint part). Further, even when the line segment comprised of the top side lines Lo, Lf has bent points at a plurality of points, similar effects can be obtained.

Here, in the examples shown in FIG. 3B, FIG. 4A, and FIG. 4B, preferably the slant angle $\theta$ of the top side line Lo of the vehicle width outside part 34$o$ with respect to the top side line Li of the vehicle width inside part 34$i$ or the slant angle (maximum value) $\theta$ of the top side line Lo with respect to the top side line Li in the example shown in FIG. 4C is 5° to 45°. By making the slant angle $\theta$ a value of 5° or more, it is possible to make the dimension of the vehicle width outside part 34$o$ of the cross member 34 in the vehicle-lateral-direction smaller and, due to this, make the dimension of the vehicle width inside part 34$i$ in the vehicle-lateral-direction larger and further broaden the mounting region for a seat rail base and in turn further effectively utilize the cabin space.

On the other hand, by making the slant angle $\theta$ a value of 45° or less, in a side view of the vehicle-longitudinal-direction, it is possible to reduce the bending angle between the top side lines Li, Lo of the cross member 34. Due to this, for example, when a load is applied bending the cross member 34 in the vehicle-height-direction, it is possible to suppress bending deformation at the bending point and make the joint part high in rigidity, in other words, secure bending rigidity in the vehicle-height-direction at a high level. Further, by suppressing the slant angle $\theta$ to 45° or less, as explained above, it becomes possible to secure not only bending rigidity in the vehicle-height-direction, but also bending rigidity in the vehicle-longitudinal-direction and axial torsion rigidity at a high level.

Note that, when making the slant angle $\theta$ a value of 10° to 25°, these effects can be exhibited at a further higher level, so this is more preferable.

As explained above, by making the slant angle $\theta$ of the top side line Lo of the vehicle width outside part 34$o$ with respect to the top side line Li of the vehicle width inside part 34$i$ a value of 5° to 45°, it is possible to both secure the mounting region for a seat rail base in the vehicle-lateral-direction and secure the rigidity of the joint part at a high level. Below, examples both securing the region and securing the rigidity at even higher levels will be explained.

That is, the inventors obtained the finding that to further both secure the region and secure the rigidity, it is necessary to define the dimensions of the parts of the vehicle-joint-structure in particular in detail. Specifically, the inventors focused on not only making the dimension Wi of the vehicle width inside part 34$i$ in the vehicle-lateral-direction with respect to the overall width W of the cross member 34 in the vehicle-lateral-direction (at the inside from the side sill 32 in the vehicle-lateral-direction) (vehicle width inside part width ratio) a value of 75% to 95% and making the slant angle $\theta$ of the top side line Lo of the vehicle width outside part 34$o$ with respect to the top side line Li a value of 5° to 45°, but also the relationship among the dimension Ws of the side sill 32 shown in FIG. 4 in the vehicle-lateral-direction, the dimension Hs of the outermost part of the sill 32 in the vehicle-lateral-direction along the vehicle-height-direction, the dimension W of the cross member 34 in the overall vehicle-lateral-direction (at the inside from the side sill 32 in the vehicle-lateral-direction), the dimension Hc of the innermost part of the cross member 34 in the vehicle-height-direction along the vehicle-lateral-direction (only part with top side line Li extending in vehicle-lateral-direction), the dimension Wi (Wi=$\alpha$W) of the vehicle width inside part of the cross member 34 in the vehicle-lateral-direction defined using a real number $\alpha$ of 0.75 to 0.95, and the dimension Hco (Hco=$\beta$Hc) of the outermost part of the cross member 34 in the vehicle-height-direction along the vehicle-lateral-direction (however, excluding top surface flange 34$fa$) defined using a real number $\beta$ of (Hc+5)/Hc to (Hs−5)/Hc. Note that, the units of the dimensions of the parameters are all mm.

Further, the inventors obtained the finding that, based on these parameters Ws, Hs, W, Hc, Wi, and Hco, by making the real number $\gamma$ ($\gamma=(\beta-1)Hc/W/(1-\alpha)$) a value of 0.0875 to 1.0 and making the real number $\varepsilon$ ($\varepsilon=\{(\beta-1)Hc/W/(1-\alpha)-(Hs-\beta Hc)/Ws\}/\{1+(\beta-1)Hc(Hs-\beta Hc)/W/Ws/(1-\alpha)\}$) a value of −0.364 to 0.364, it is possible to secure the mounting region for a seat rail base in the vehicle-lateral-direction and secure the rigidity of the joint part at a high level.

Note that, the range of the real number $\alpha$ defines the upper limit and lower limit of the dimension Wi of the vehicle width inside part 34$i$ in the vehicle-lateral-direction with respect to the dimension W of the cross member 34 in the overall vehicle-lateral-direction (at the inside from the side sill 32 in the vehicle-lateral-direction). Similarly, the range of the real number $\beta$ defines the upper limit and lower limit of the dimension Hco of the outermost part in the vehicle-lateral-direction along the vehicle-height-direction with respect to the dimension Hc of the innermost part of the cross member 34 in the vehicle-lateral-direction along the vehicle-height-direction in a range meaningful geometrically.

The range of the real number $\gamma$ defines the upper limit and lower limit of the amount corresponding to the slant angle $\theta$ with respect to the top side line Li of the top side line Lo of the vehicle width outside part 34$o$. Note that, when the real number $\gamma$ is 0.0875, $\theta$ becomes 5°, while when $\gamma$ is 1, $\theta$ becomes 45°.

The range of the real number $\varepsilon$ defines the upper limit and lower limit of the amount corresponding to the bending angle $\varphi$ of the line segment comprised of the top side line Lo of the vehicle width outside part 34$o$ and top surface flange line Lf of the cross member 34. Note that, when the real number $\varepsilon$ is −0.364, $\varphi 0$ becomes −25°, while when $\varepsilon$ is 0.364, $\varphi$ becomes 25°.

Assuming such ranges of real numbers $\gamma$, $\varepsilon$, it is preferable to make the range of the real number $\varepsilon$ −0.268 to 0.268, that is, make the bending angle $\varphi$ −15° to 15°, from the viewpoint of improving the rigidity. In particular, making the real numbers $\varepsilon$ zero would make the bending angle $\varphi$ zero. For this reason, by adjusting the dimensions so that the real number $\varepsilon$ becomes zero, as explained above in relation to the example shown in FIG. 4A, it is possible to arrange the top side lines Ls, Lf, and Lo on a single straight line while considering an amount of deviation of the plate thicknesses of the component elements 32, 34. Therefore, making the real number $\varepsilon$ zero is particularly preferable from the viewpoint of improving the rigidity of the joint part.

Figure 5:
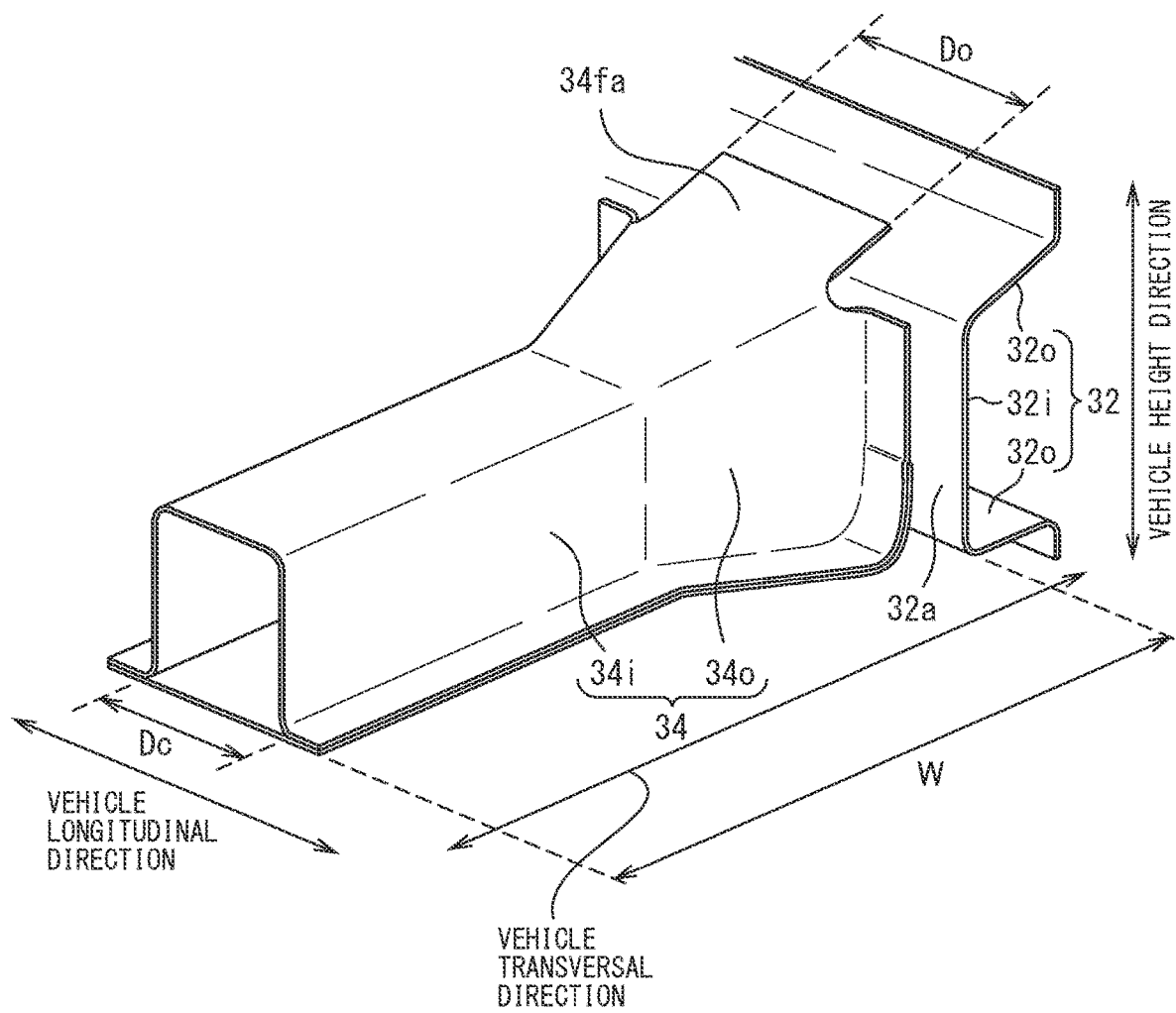
FIG. 5 is a modification of a vehicle-joint-structure shown in FIG. 3A where the dimension of the vehicle width outside part in the vehicle-longitudinal-direction becomes broader toward the outside in the vehicle-lateral-direction.

Next, in the example shown in FIG. 3B, as shown in FIG. 5 (modification of vehicle-joint-structure shown in FIG. 3A), preferably the vehicle width outside part 34o of the cross member 34 becomes broader in the vehicle-longitudinal-direction toward the outside in the vehicle-lateral-direction. As shown in FIG. 5, if the vehicle width outside part 34o of the cross member 34 becomes broader toward the outside in the vehicle-lateral-direction in the vehicle-longitudinal-direction, compared with the example shown in FIGS. 3A and 3B, it is possible to increase more the area of the joining region for the cross member 34 with the lateral surface 32a of the side sill 32. For this reason, in the example shown in FIG. 5, in particular it is possible to improve the strength of the joint part and in turn the various rigidities of the joint part at a further higher level.

Note that, in the example shown in FIG. 5, when designating the overall dimension of the cross member 34 in the vehicle-lateral-direction (at the inside from the side sill in the vehicle-lateral-direction) as W, designating a real number of 0.75 to 0.95 as a, and designating a dimension of the innermost part of the cross member 34 in the vehicle-lateral-direction along the vehicle-longitudinal-direction as Dc, preferably the dimension Do at the outermost part of the top surface flange 34fa in the vehicle-lateral-direction along the vehicle-longitudinal-direction is Dc+0.175(1−α)W to Dc+(1−α)W.

By making the dimension Do in the vehicle-longitudinal-direction the value Dc+0.175(1−α)W or more using W, α, and Dc, it is possible to sufficiently secure the rigidity of the joint part, in particular the bending rigidity in the vehicle-longitudinal-direction, by sufficiently securing the joining region between the outside part 32o of the side sill 32 and the top surface flange 34fa.

On the other hand, by making the dimension Do Dc+(1−α)W in the vehicle-longitudinal-direction or less, it is possible to keep down the bending angle formed by the side wall of the innermost part of the cross member 34 in the vehicle-lateral-direction and the side wall at the outermost part in the vehicle-lateral-direction, suppress the deformation at the bending point when for example a bending load in the vehicle-longitudinal-direction is applied to the cross member 34, and in turn sufficiently secure bending rigidity in the vehicle-longitudinal-direction.

Figure 6:
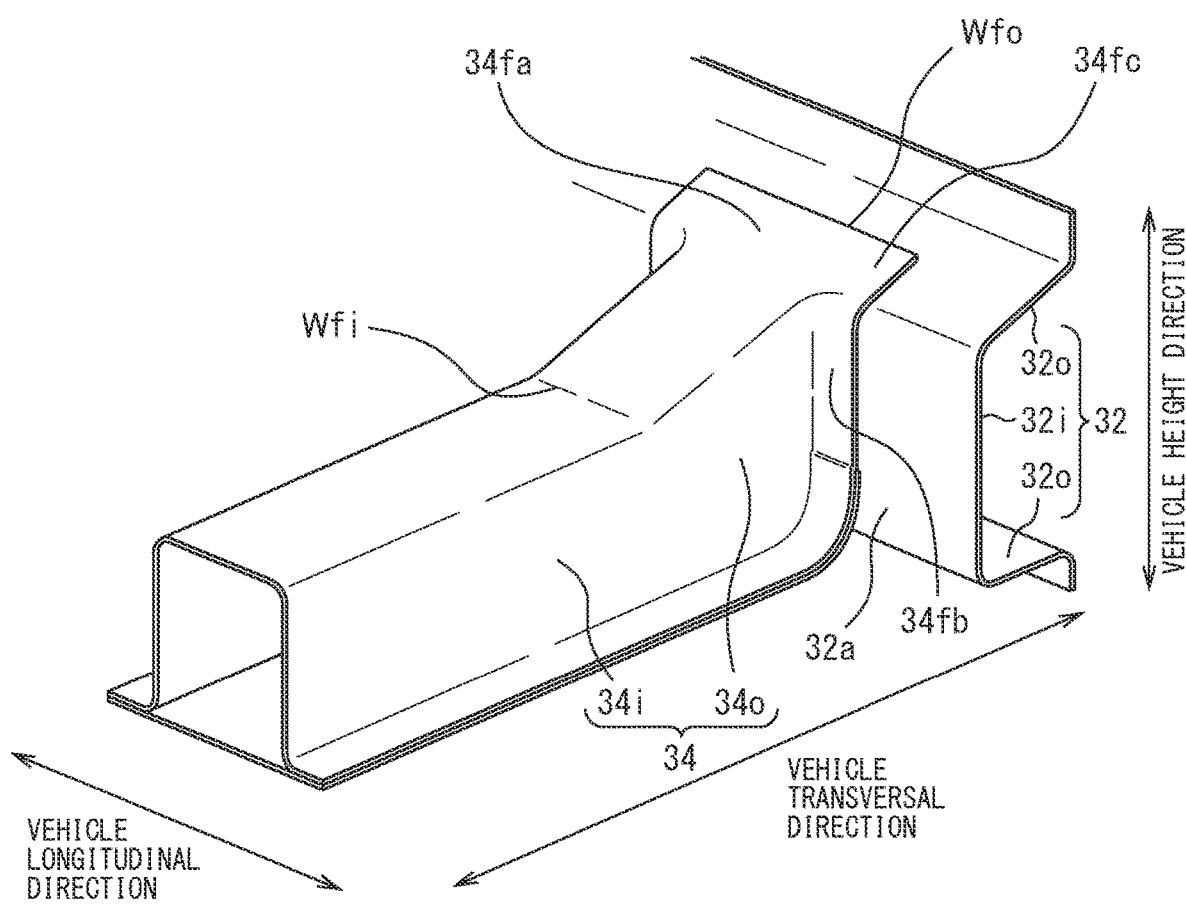
FIG. 6 is a modification of a vehicle-joint-structure shown in FIG. 3A where the top surface flange joined with the outside part of the side sill and lateral surface flange joined with the side wall of the side sill are integral.

In addition, in the example shown in FIG. 3A, as shown in FIG. 6 (modification of vehicle-joint-structure shown in FIG. 3A), preferably the top surface flange 34fa joined to the outside part 32o of the side sill 32 and the lateral surface flange 34fb joined to the side wall 32a of the side sill 32 are integrally formed.

In the example shown in FIGS. 3A and 3B, the top surface flange 34fa and the lateral surface flange 34fb of the cross member 34 were not formed integrally. In other words, the edge parts of the two flanges 34fa, 34fb in the vehicle-lateral-direction were not connected.

As opposed to this, in the example shown in FIG. 6, the edge parts of the flanges 34fa, 34fb in the vehicle-lateral-direction are connected, so the rigidity of the vehicle width outside part 34o of the cross member 34 can be improved. Further, in the example shown in FIG. 6, compared with the example shown in FIGS. 3A and 3B, a corner flange 34fc positioned between the two flanges 34fa, 34fb can further be provided and in turn the joined region for the side sill 32 and cross member 34 can be enlarged. Due to this, increase of the number of spot welds in the joined region and increase of the bonded area by a binder in the joined area become possible, so the efficiency of transmission of a load from the cross member 34 to the side sill 32 can be further improved.

Therefore, by integrally forming the two flanges 34fa, 34fb and as a result forming a corner flange 34fc between them, it is possible to further improve the rigidity of the joint part.

Note that, while not shown, two or more examples among the examples of the present invention shown from FIGS. 3A and 3B to FIG. 6 may also be combined. It therefore possible to enjoy the merits of the respective examples as desired by the designers.

Embodiment 2 (Combined Structure of Side Sill and Center Pillar)

Figure 7A:
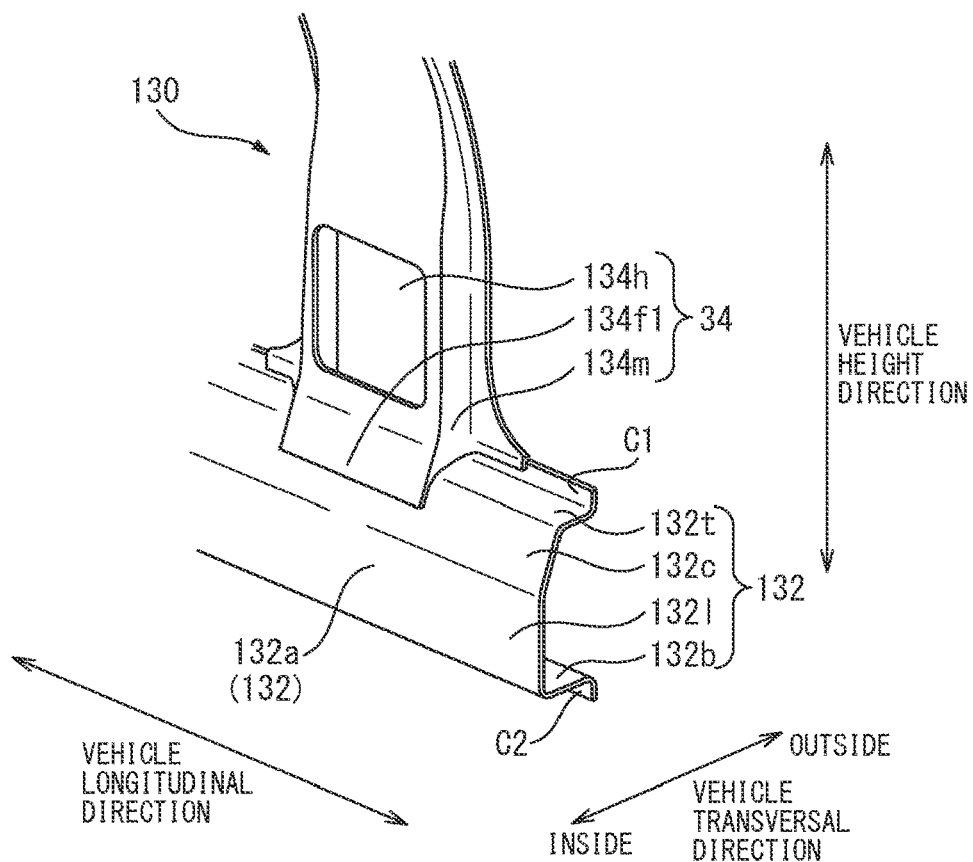
Figure 7B:
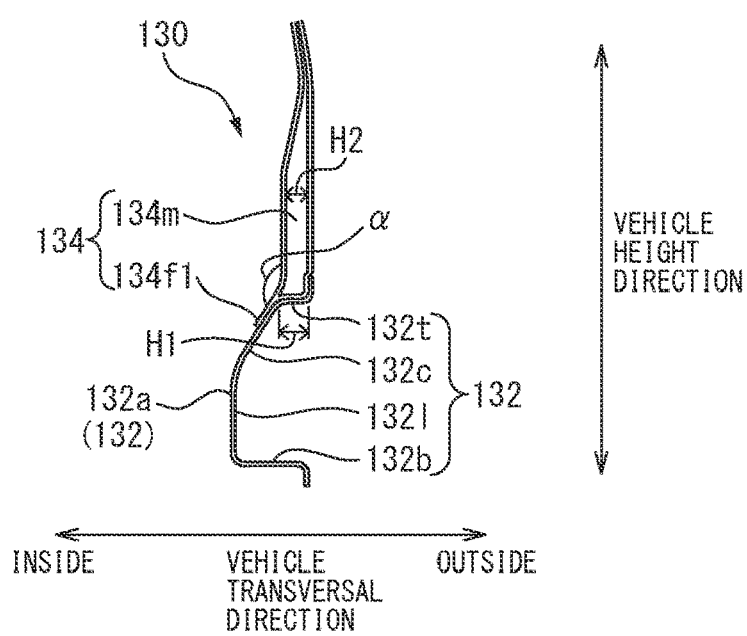

FIGS. 7A and 7B are views showing a vehicle-joint-structure 130 of one type of T-shaped joint structure according to another embodiment of the present invention, wherein FIG. 7A is a perspective view and FIG. 7B is a view of the lateral surface in the vehicle-longitudinal-direction. The vehicle-joint-structure 130 is a structure related to a vehicle body frame. Usually, the vehicle body frame is connected to the chassis frame and is arranged so as to surround the seat base. The vehicle-joint-structure 130 is provided with a side sill 132 extending in the vehicle-longitudinal-direction (first member) and center pillar 134 connected to the side sill 132 and extending in the vehicle-height-direction (second member). Note that, in FIGS. 7A and 7B, the illustrated examples of the side sill 132 and center pillar 134 are just the inner members, but in actuality, there are respective outer members at the outside in the vehicle-lateral-direction.

The side sill 132, as shown in FIG. 7A, includes a top part 132t extending in the vehicle-lateral-direction, a lateral part 132l extending at the inside of the vehicle-lateral-direction of the top part 132t in the vehicle-height-direction, a bottom part 132b connected with the bottommost part of the lateral part 132l in the vehicle-height-direction and extending to the outside in the vehicle-lateral-direction, and a chamfered part 132c connecting both the top part 132t and lateral part 132l. Note that, at the outermost parts of the top part 132t and bottom part 132b in the vehicle-lateral-direction, flanges c1 and c2 are provided for connecting with not shown outer members.

On the other hand, the center pillar 134, as shown in FIG. 7A, includes a main body part 134m joined with the top part 132t and a first flange 134f1 running from the innermost part of the main body part 134m in the vehicle-lateral-direction downward in the vehicle-height-direction and joined with at least the chamfered part 132c. The main body part 134m is provided with a hole 134h for a seatbelt anchor.

Here, the "first flange 134f1 of the center pillar 134" will be deemed the part extending at the innermost part of the center pillar 134 in the vehicle-lateral-direction along at least the front surface of the chamfered part 132c and positioned from the front surface of the top part 132t downward in the vehicle-height-direction. For this reason, the part running from the first flange 134f1 upward in the vehicle-height-direction (innermost part of center pillar 134 in vehicle-lateral-direction positioned upward in vehicle-height-direction from front surface of top part 132t) is defined as the "main body part 134m of the center pillar 134".

As shown in FIG. 7B, in the side sill 132, the part joined with the center pillar 134, that is, the chamfered part 132c (first member side joining element), is slanted from the side sill 132 toward the center pillar 134 so that the side sill 132 is tapered.

Further, as shown in FIG. 7B, at the center pillar 134, the part joined with the side sill 132, that is, the first flange 134f1 (second member side joining element) is slanted from the side sill 132 toward the center pillar 134 in the same direction as the chamfered part 132c of the side sill 132 (first member side joining element).

Further, as shown in FIG. 7B, the chamfered part 132c (first member side joining element) and the flange 134f1 (second member side joining element) are smoothly joined to form a joined part. This joined part is present at least at one side of the side sill 132 and center pillar 134 in the transversal direction, that is, only the left side.

Further, at the center pillar 134, as shown in FIG. 7B, in the side view of the vehicle-longitudinal-direction, the bending angle α between the front surface of the main body part 134m and the front surface of the first flange 134f1 can be made 135° to 170°. Here, the "bending angle α" means the smaller angle among the angles formed by the front surface of the main body part 134m and the front surface of the first flange 134f1 in the same view.

Note that, the side sill 132 and center pillar 134 both may be formed from any known materials. For example, high strength steel plate, aluminum, magnesium, titanium, polypropylene, PAN-based carbon fiber using acrylic fiber, or another carbon fiber composite material etc. can be used.

Further, the side sill 132 and center pillar 134 can both be formed by, for example, drawing high strength steel plate. Further, the center pillar 134 can be joined to the side sill 132 by any conventional technique (for example, spot welding, laser welding, and bolting).

According to the thus configured vehicle-joint-structure 30 of the present embodiment, due to the above-mentioned mode of joining the chamfered part 132c of the side sill 132 and the first flange 134f1 of the center pillar 134, it is possible to keep the center pillar 132 from bulging to the inside in the vehicle-lateral-direction at the bottom of the vehicle-height-direction. As a result, it is possible to make the cabin space larger and increase the freedom of installation position and shape of the interior parts and, further, possible to secure rigidity of the joint part.

In particular, in the example shown in FIGS. 7A and 7B, for example, if a load is applied bending the center pillar 134 in the vehicle-longitudinal-direction, the load applied to the center pillar 134 is successively efficiently transmitted through the first flange 134f1 and chamfered part 132c of the side sill 132 to the lateral surface 132a of the side sill 132. Therefore, according to the present embodiment, sufficient rigidity of the joint part is obtained. In particular, excellent bending rigidity in the vehicle-longitudinal-direction can be secured.

Note that, in the vehicle-joint-structure 130 combining the side sill 132 and center pillar 134, at the time of vehicle operation, a load is applied causing the center pillar 134 to deform in various directions (bending load in vehicle-longitudinal-direction, bending load in vehicle-lateral-direction, axial force in vehicle-height-direction, torsional torque about axis of vehicle-height-direction, etc.) It is learned that the rigidities against these loads have positive correlation with the rigidity against the above bending in the vehicle-longitudinal-direction and all trend the same. Therefore, as explained above, in the vehicle-joint-structure according to the present embodiment enabling the bending rigidity in the vehicle-longitudinal-direction to be sufficiently raised, it can be said that the bending rigidity in the vehicle-lateral-direction, the rigidity against axial force in the vehicle-height-direction and the torsional torque about the axis in the vehicle-height-direction, etc. can be sufficiently secured.

Due to this, according to the vehicle-joint-structure 130 according to the present embodiment, it is possible to both broaden the cabin space and secure rigidity of the joint part.

In such a vehicle-joint-structure 130 (FIGS. 7A and 7B), in a side view of the side sill 132 in the longitudinal direction (first member), the angle formed by the longitudinal direction of the center pillar 134 (second member) (vertical direction) and the front surface of the chamfered part 132c (first member side joining element) is preferably 45° or less. Note that, the "angle formed" here is the angle shown in FIG. 7B by (180-α). According to such a configuration, it is possible to keep down the slant angle of the side sill 132 with respect to the horizontal plane and, furthermore, raise the rigidity of the joint part. Note that if making this formed angle α value of 2.5° to 27°, the effect can be exhibited at a further higher level.

Further, in the vehicle-joint-structure 130 of FIG. 7, in the side view of the side sill 132 in the longitudinal direction (first member), at the part of the center pillar 134 other than the first flange 134f1 (second member side joining element), the ratio H2/H1 of the minimum dimension H2 to the maximum dimension H1 of the center pillar 134 in a direction vertical to the longitudinal direction is preferably 0.5 to 0.92. By making the ratio H2/H1 a value of 0.5 or more, it is possible to raise the rigidity of the joint part more, while by making it 0.92 or less, it is possible to secure a broader cabin space. Note that, if making this ratio H2/H1 a value of 0.65 to 0.79, these effects are exhibited at a further higher level.

Furthermore, in the vehicle-joint-structure 130 of FIG. 7, when making the formed angle α value of 0, preferably (H1/H2−1)/2≤tan θ is satisfied. By satisfying this, it is possible to secure the space of the vehicle body in the vehicle-lateral-direction and the shapeability of the center pillar while raising the rigidity of the joint part comprised of the side sill and center pillar, and, furthermore, raising the bending rigidity in the vehicle-longitudinal-direction, the bending rigidity in the vehicle-lateral-direction, and axial torsional rigidity in the vehicle-longitudinal-direction of the vehicle body.

Note that, in the side view of the vehicle-longitudinal-direction, by making the bending angle α of the front surface of the main body part 134m and the front surface of the first flange 134f1 of the center pillar 134 a value of 135° or more, it is possible to keep down the degree of bending of the main body part 134m and first flange 134f1 of the center pillar 134. Due to this, if a load is applied bending the center pillar 134 in the vehicle-longitudinal-direction, it is possible to suppress deformation of the joint part and possible to realize excellent bending rigidity in the vehicle-longitudinal-direction.

On the other hand, in the side view of the vehicle-longitudinal-direction, by making the bending angle α of the front surface of the main body part 134m and the front surface of the first flange 134f1 of the center pillar 134 a value of 170° or less, it is possible to keep the dimension of the main body part 134m of the center pillar 134 in the vehicle-lateral-direction from becoming excessively large. Due to this, it is possible to further lengthen the dimension of the cabin space in the vehicle-lateral-direction and possible in turn to further increase the degree of freedom relating to the mounting positions or shapes of the interior parts.

Further, when making the bending angle α a value of 145° to 165°, it is possible to obtain the above effects at a further higher level, so this is preferable. When made 155° to 160°, it is possible to obtain the above effects at a further higher level, so this is still more preferable.

Above, embodiments of the present invention were explained, but the present invention is not limited to the above embodiments. Various changes can be made within a scope not deviating from the gist of the invention.

Next, another preferred example of the vehicle-joint-structure 130 shown in the above-mentioned FIGS. 7A and 7B will be mentioned. For example, in the example shown in FIGS. 7A and 7B, further, it is possible to smoothly connect the main body part 134*m* and the first flange 134*f*1. In this case, it is possible to keep down the extent of bending of the main body part 134*m* and the first flange 134*f*1 of the center pillar 134. Due to this, it is possible to raise the joint rigidity with respect to longitudinal direction bending of the center pillar 134 at a high level.

Figure 8A:
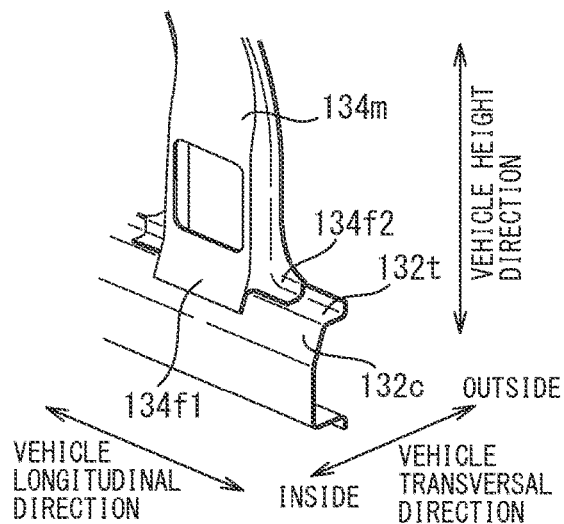
Figure 8B:
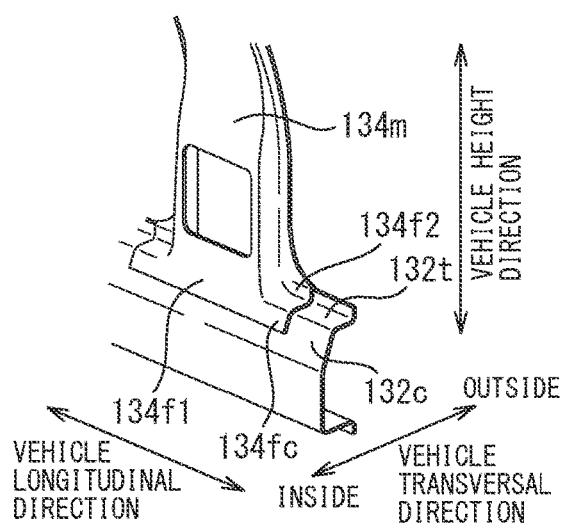
Figure 8C:
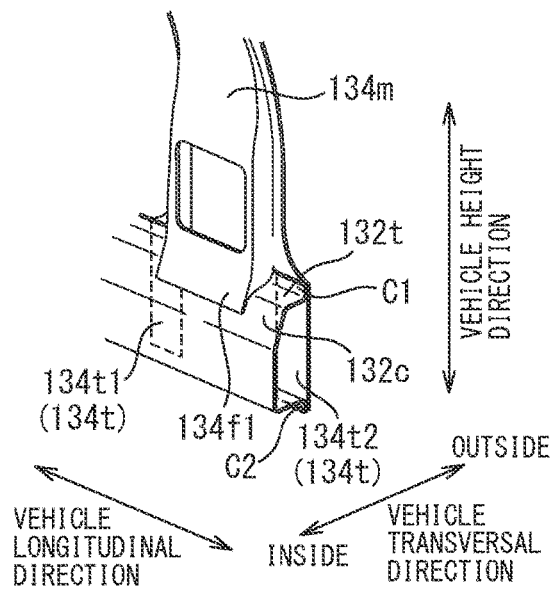
Figure 8D:
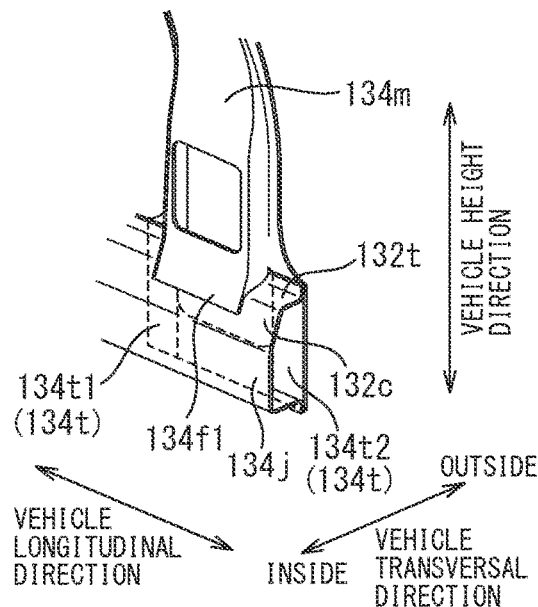

FIGS. 8A to 8D are perspective views showing modifications of the vehicle-joint-structure shown in FIGS. 7A and 7B. Note that, FIG. 8A is an example where the center pillar 134 is provided with a second flange 134*f*2, FIG. 8B is an example where the second flange 134*f*2 is connected to the first flange 134*f*1, FIG. 8C is an example where the center pillar 134 is provided with at least one tab 134*t*, and FIG. 8D is an example where two tabs 134*t*1 and 134*t*2 are joined.

As shown in FIG. 8A, the center pillar 134 may further include second flanges 134*f*2 running from the end parts of the main body part 134*m* in the vehicle-longitudinal-direction (meaning sides away from facing end parts, below, sometimes referred to as "outside in the vehicle-longitudinal-direction") and connected to the top part 132*t*.

By the center pillar 134 further containing such shapes of second flanges 134*f*2, it is possible to increase the joined region for the center pillar 134 and in particular the top part 132*t* of the side sill 132. Due to this, the various rigidities of the joint part can be further enhanced.

Further, as shown in FIG. 8B, the second flanges 134*f*2 can be connected to the first flange 134*f*1. Here, the two flanges 134*f*1, 134*f*2 being connected means that the two flanges 134*f*1, 134*f*2 are directly connected without going through the main body part 134*m*.

In this way, in the example shown in FIG. 8B, by connecting the flanges 134*f*1, 134*f*2, the flange joined parts 134*fc* are formed. Due to the flange joined parts 134*fc*, it is possible to further increase the joined region for the center pillar 134 and top part 132*t* and chamfered part 132*c* of the side sill 132. Due to this, it is possible to further raise the various types of rigidity of the joint part.

Furthermore, as shown in FIG. 8C, the center pillar 134 can be further provided with at least one tab 134*t* running from the outermost part of the main body part 134*m* in the vehicle-lateral-direction to downward in the vehicle-height-direction and connected to the side sill 132 from the outside in the vehicle-lateral-direction.

In the example shown in FIG. 8C, the center pillar 134 includes two tabs 1345*t*1 and 134*t*2 aligned in the longitudinal direction of the vehicle and extending in the vehicle-height-direction. The two tabs 134*t*1, 134*t*2 are both connected to component elements of the side sill 132 of the two side flanges c1 and c2 in the vehicle-height-direction and are connected to a not shown side sill outer panel. According to such a configuration, the load applied to the center pillar 134 can be efficiently transmitted through the tabs 134*t*1 and 134*t*2 to the side sill 132. Due to this, it is possible to further raise the rigidities of the joint part.

Here, in the example shown in FIG. 8C, as shown in FIG. 8D, it is possible to join at least two of the tabs 134*t* with tabs adjoining them in the vehicle-longitudinal-direction. As the mode of joining, as shown in FIG. 8D, the mode of joining the tabs 134*t*1, 134*t*2 through the joining members 134*j*, then connecting the tabs 134*t*1, 134*t*2 from the outermost part of the main body part 134*m* in the vehicle-lateral-direction downward in the vehicle-height-direction may be mentioned. Further, as another mode of joining, a mode of integrally forming the tabs 134*t*1, 134*t*2 and joining member 134*j* and extending this formed shape from the outermost part of the main body part 134*m* in the vehicle-lateral-direction downward in the vehicle-height-direction may be mentioned.

By joining the component elements of the center pillar 134 of the two adjoining tabs 134*t*1, 134*t*2, it is possible to suppress relative deformation of the two tabs 134*t*1, 134*t*2 at the time of vehicle operation. Due to this, load applied to the center pillar 134 can be more efficiently transmitted through the tabs 134*t*1, 134*t*2 to the side sill 132. As a result, the various rigidities of the joint part can be further raised.

EXAMPLES

Example 1 (Combined Structure of Side Sill and Cross Member)

To check the effect of the present embodiment, the inventors used the T-shaped joint structure comprised of a side sill and cross member produced by high strength steel plate to investigate the mounting dimension of the seat rail base in the vehicle-lateral-direction and the rigidity of the joint part.

Figure 1A:
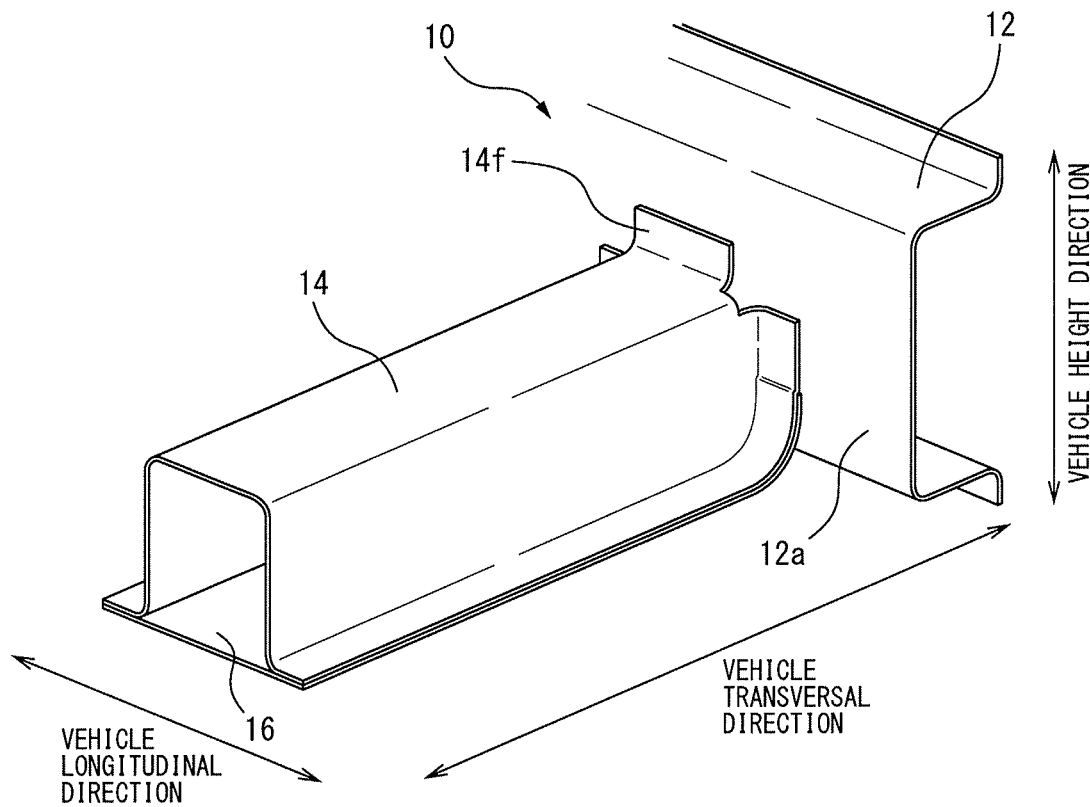
Figure 1B:
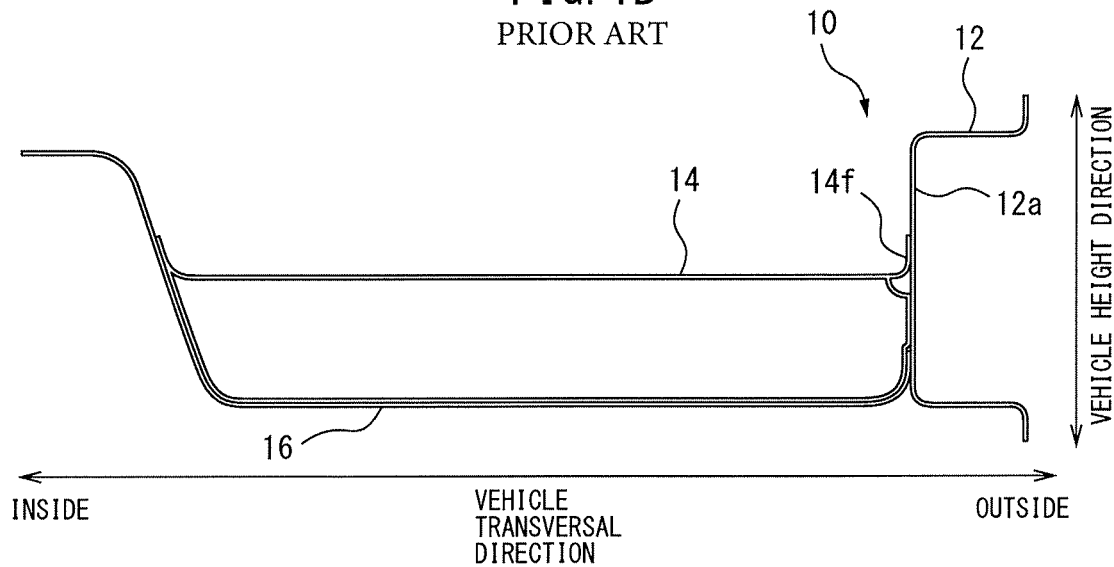

Side sills and cross members of the types shown in FIGS. 3A and 3B were joined by spot welding to prepare T-shaped joint structures of Invention Example 1 to Invention Example 4. Further, a side sill and cross member of the type shown in FIGS. 1A and 1B were joined by spot welding to prepare a T-shaped joint structure of Conventional Example 1. Note that, the shapes and dimensions of the cross members and side sills of Conventional Example 1 and Invention Examples 1 to 4 were made ones as shown in Table 1. Further, the other design conditions of the test examples were made ones as shown in Table 3. In each test example, the floor panel, for example, as shown in FIG. 3A, was set so as to close the end parts in the vehicle-longitudinal-direction together with the bottom flanges 34*fc* of the cross member 34 over the entire region in the vehicle-lateral-direction. The plate thickness was made 0.75 mm. Furthermore, while not shown, at the outside of the side sill (inner) in the vehicle-lateral-direction, a side sill (outer) joined at the top and bottom flanges of the side sill (inner) was provided, the dimension in the vehicle-lateral-direction was made 50 mm, and the plate thickness was made 1.4 mm. In Table 2, the "angle formed" means the angle formed in FIG. 3B between the longitudinal direction of the center pillar 34 and the front surface of the outside part 32*c* of the side sill 132 ($\theta$-$\varphi$).

TABLE 1

|  | Dimension in vehicle-height-direction (mm) | Dimension in vehicle-lateral-direction (mm) | Dimension in vehicle-longitudinal-direction (mm) | Plate thickness (mm) |
| --- | --- | --- | --- | --- |
| Cross member | 65 | 630 | 75 | 1.6 |
| Side sill | 125 | 50 | 800 | 1.4 |

TABLE 2

|  | Conventional Example 1 | Invention Example 1 | Invention Example 2 | Invention Example 3 | Invention Example 4 |
| --- | --- | --- | --- | --- | --- |
| Type of T-shaped joint structure | FIG. 1 | FIG. 3 | FIG. 3 | FIG. 3 | FIG. 3 |
| Whether angle formed is 45° or less | — | Over 45° (48°) | 45° or less (20°) | 45° or less (25°) | 45° or less (25°) |
| Ratio (H2/H1) | — | 0.6 | 0.95 | 0.7 | 0.7 |
| Whether $(H1/H2 - 1)/2 \leq \tan\theta$ is satisfied | — | Not satisfied | Not satisfied | Not satisfied | Satisfied |
| Evaluation of mounting region for other member | 100 | 100 | 90 | 95 | 100 |
| Evaluation of rigidity of joint part | 100 | 110 | 180 | 150 | 120 |
| Evaluation of shapeability | Good | Poor | Good | Fair | Good |
| Evaluation of lightening of weight | 100 | 100 | 95 | 80 | 80 |

Evaluation of Mounting Region for Other Member

For each test example, the mounting region (design space) for another member (seat rail base in vehicle-lateral-direction) was calculated and evaluated indexed to Conventional Example 1 (100). This evaluation shows that the larger the index, the greater the length of the cabin space in the vehicle-lateral-direction. The results are shown together in Table 2.

Evaluation of Rigidity of Joint Part

For each test example, translation in all directions and rotation in all directions at the two end parts of the inner side sill and outer side sill in the vehicle-height-direction were constrained and a load was applied to the innermost part of the cross member in the vehicle-lateral-direction from above in the vehicle-height-direction. The ratio of this load and the displacement in the vehicle-height-direction at the innermost end of the cross member in the vehicle-lateral-direction was calculated as the rigidity of the joint part. Further, the results of calculation were evaluated indexed to the conventional example (100). This evaluation shows that the larger the index, the greater the rigidity of the joint part. The results are shown together in Table 2.

Evaluation of Shapeability

The shapeability when preparing the test examples was evaluated as "good" when shaping is possible. Further, with low strength steel plate with good ductility, the case where shaping is possible was evaluated as "fair", while with high strength steel plate, the case where shaping is not possible was evaluated as "fair". Further, with low strength steel plate, the case where shaping is not possible was evaluated as "poor". The results are shown together in Table 2.

Evaluation of Lightening of Weight

The test examples were measured for weight and evaluated indexed to Conventional Example 1 (100). This evaluation shows that the smaller the index, the more the weight is reduced. The results are shown together in Table 2.

According to Table 2, it is understood that the T-shaped joint structures of Invention Examples 1 to 4 improved in the shape of the side sill (first member) and the cross member (second member) and in turn the mode of joining these and falling within the technical scope of the present invention were all greatly improved in the balance of evaluation of the mounting region for another member (mounting region for seat rail base) and secured rigidity of the joint part compared with the T-shaped joint structure of Conventional Example 1 not falling under the technical scope of the present invention. Note that, for the Invention Example 2 and Invention Example 4, it is learned that the angle formed is made 27° or less, so it is possible to reduce the strain introduced to a material at the time of press-forming the cross member, so the shapeability is particularly good. Further, for the Invention Example 3 and Invention Example 4, it is learned that since the rigidity of the joint part of the cross member and side sill is high, it is possible to reduce the thickness of the cross member, so the weight can be greatly reduced.

Example 2 (Combined Structure of Side Sill and Center Pillar)

To confirm the effects of the present embodiment, T-shaped joint structures comprised of side sills and center pillars produced by high strength steel plates were used to investigate the length of the cabin space in the vehicle-lateral-direction and rigidity of the joint part etc.

Figure 9A:
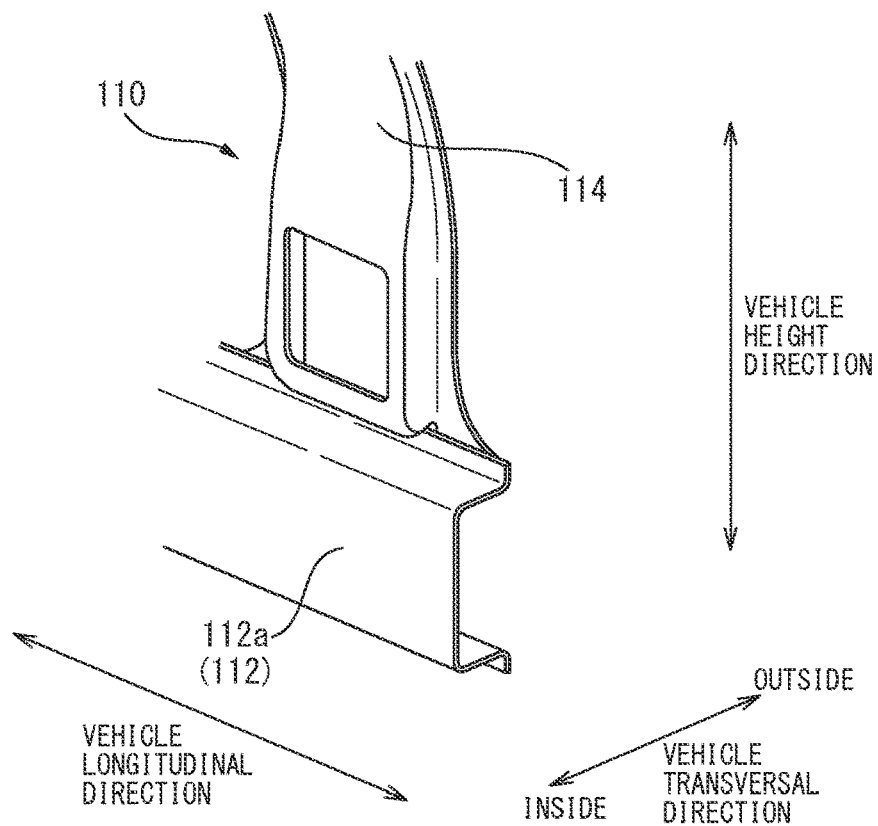
Figure 9B:
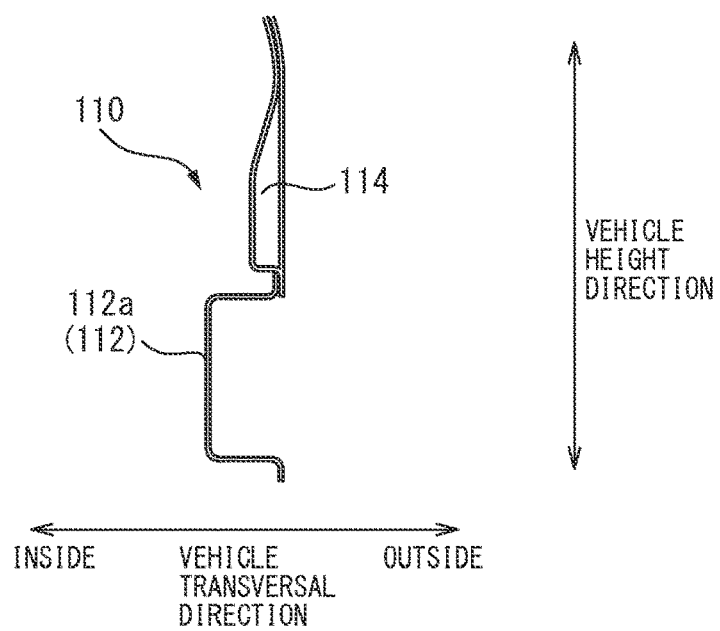

Side sills and center pillars of the types shown in FIGS. 7A and 7B were joined by spot welding to prepare T-shaped joint structures of Invention Example 5 to Invention Example 8. Further, a side sill and center pillar of the conventional type shown in FIGS. 9A and 9B were joined by spot welding to prepare a T-shaped joint structure of Conventional Example 2. Note that, the other design conditions of the center pillars and side sills of Conventional Example 2 and Invention Examples 5 to 8 were made ones as shown in Table 3. Further, in Table 3, the "angle formed" means the angle formed in FIG. 7B between the longitudinal direction of the center pillar 134 and the front surface of the chamfered part 132c of the side sill 132 (180°-α).

TABLE 3

|  | Conventional Example 2 | Invention Example 5 | Invention Example 6 | Invention Example 7 | Invention Example 8 |
|---|---|---|---|---|---|
| Type of T-shaped joint structure | FIG. 9 | FIG. 7 | FIG. 7 | FIG. 7 | FIG. 7 |
| Whether angle formed is 45° or less | — | Over 45° (48°) | 45° or less (200) | 45° or less (25°) | 45° or less (25°) |
| Ratio (H2/H1) | — | 0.6 | 0.95 | 0.7 | 0.7 |
| Whether (H1/H2 − 1)/2 ≤ tanθ is satisfied | — | Not satisfied | Not satisfied | Not satisfied | Satisfied |
| Evaluation of mounting region for other member | 100 | 100 | 90 | 95 | 100 |
| Evaluation of rigidity of joint part | 100 | 110 | 130 | 150 | 120 |
| Evaluation of shapeability | Good | Poor | Good | Fair | Good |
| Evaluation of lightening of weight | 100 | 100 | 90 | 70 | 70 |

Evaluation of Mounting Region for Other Member

For each test example, the minimum length of the cabin space in the vehicle-lateral-direction was measured at the position of the main body part of the center pillar in the vehicle-height-direction (position in vertical direction, that is, position above topmost part of side sill in vehicle-height-direction by 100 mm in vehicle-height-direction). Further, the results of measurement were evaluated indexed to Conventional Example 2 (100). This evaluation shows that the larger the index, the greater the length of the cabin space in the vehicle-lateral-direction. The results are shown together in Table 3.

Evaluation of Rigidity of Joint Part

For each test example, all translation and all rotation at the two end parts of the inner side sill and outer side sill in the vehicle-height-direction were constrained and a load was applied to the top end of the center pillar in the vehicle-height-direction from one side in the vehicle-longitudinal-direction. The ratio of this load and the displacement in the vehicle-longitudinal-direction of the top end of the center pillar in the vehicle-height-direction was calculated as the rigidity of the joint part. Further, the results of calculation were evaluated indexed to Conventional Example 2 (100). This evaluation shows that the larger the index, the greater the rigidity of the joint part. The results are shown together in Table 3.

Evaluation of Shapeability

The shapeability when preparing the test examples was evaluated as "good" when shaping is possible and as "poor" when shaping is not possible. The results are shown together in Table 3.

Evaluation of Lightening of Weight

The test examples were measured for weight and evaluated indexed to Conventional Example 2 (100). This evaluation shows that the smaller the index, the more the weight is reduced. The results are shown together in Table 3.

According to Table 3, it is understood that the T-shaped joint structures of Invention Examples 5 to 8 improved in the shape of the side sill (first member) and the center pillar (second member) and falling within the technical scope of the present invention were all greatly improved in the balance of evaluation of the mounting region for other members (length of cabin space in vehicle-lateral-direction length) and secured rigidity of the joint part compared with the T-shaped joint structure of Conventional Example 2 not falling under the technical scope of the present invention. Note that, for the Invention Example 6 and Invention Example 8, it is learned that the angle formed is made 27° or less, so it is possible to reduce the strain introduced to a material at the time of press-forming the cross member, so the shapeability is particularly good. Further, for the Invention Example 7 and Invention Example 8, it is learned that since the rigidity of the joint part of the cross member and side sill is high, it is possible to reduce the thickness of the cross member, so the weight can be greatly reduced.

REFERENCE SIGNS LIST 10, 20, 30. vehicle-joint-structures
12, 22, 32. side sills
12a, 22a, 32a. lateral surfaces
14, 24, 34. cross members
14f, 24f. flanges
16, 26, 36. floor panels
22b. side sill top surface
24i, 34i. vehicle width inside parts
24o, 34o. vehicle width outside parts
32i. inside part
32o. outside part
34fa. top surface flange
34fb. lateral surface flange
34fc. corner flange
110, 130. vehicle-joint-structure
112, 132. side sills
112a, 132a. lateral surfaces
114, 134. center pillars
132b. bottom part
132l. lateral part
132t. top part
c1, c2. flanges
134f1. first flange
134f2. second flange
134fc. flange joined part
132c. chamfered part
134h. hole
134j. joining member
134m. main body part
134t1, 134t2. tabs
Dc. dimension at innermost part of cross member in vehicle-lateral-direction along vehicle-longitudinal-direction
Do. dimension at outermost part of top surface flange in vehicle-lateral-direction along vehicle-longitudinal-direction h. dimension of vehicle width inside part in vehicle-height-direction
H1. maximum dimension of part other than joined part of cross member with side sill in vertical direction
H2. minimum dimension of part other than joined part of cross member with side sill in vertical direction
Hc. dimension of innermost part of cross member in vehicle-lateral-direction along vehicle-height-direction
Hco. dimension of outermost part of cross member in vehicle-lateral-direction along vehicle-height-direction
Hs. dimension of outermost part of side sill in vehicle-lateral-direction along vehicle-height-direction
Li. top side line of vehicle width inside part
Lo, L1o. top side lines of vehicle width outside part
Ls. top side line of side sill
Lf. top side line of top surface flange
W, W1. dimensions of cross member 24 in vehicle-lateral-direction
Wi, W1i. dimensions of vehicle width inside part in vehicle-lateral-direction
Wo, W1o. dimensions of vehicle width outside part in vehicle-lateral-direction
Ws. dimension of side sill in vehicle-lateral-direction
α. bending angle of front surface of main body part 134m and front surface of first flange 134f1
θ. slant angle of top side line Lo
φ. bending angle of line segment comprised of top side line Lo and top side line Lf

The invention claimed is:

1. A T-shaped joint structure provided with a first member and a second member joined to the first member and extending in a direction vertical to a longitudinal direction of the first member, wherein
in a side view of the first member in the longitudinal direction,
a first member side joining element as a part of the first member, joined to the second member is slanted at a direction which extends from the first member toward the second member so that the first member tapers,
a second member side joining element as a part of the second member, joined to the first member is slanted from the first member toward the second member in the same direction as the first member side joining element,
the first member side joining element and the second member side joining element are joined to form a joined part,
the joined part is present at least at a single side in a transversal direction of the first and second members,
an angle formed by a longitudinal direction of the second member and a front surface of the first member side joining element is 2.5° to 45°,
making a slant angle θ a value of 10° to 25°, the slant angle θ being an angle of a top side line of a vehicle width outside part with respect to a top side line of a vehicle width inside part, and
making a ratio (H2)/(H1) of a minimum dimension (H2) with respect to a maximum dimension (H1) in a direction vertical to the longitudinal direction of the second member at a part of the second member other than the first member side joining element a value of 0.65 to 0.79.

2. The T-shaped joint structure according to claim 1, wherein when the angle formed by the longitudinal direction of the second member and the front surface of the first member side joining element is made ψ, ((H1)/(H2)−1)/2≤tan ψ is satisfied.

3. The T-shaped joint structure according to claim 1, further comprising making a bending angle φ−25° to 0°.

* * * * *